(12) United States Patent
Lei et al.

(10) Patent No.: US 11,838,920 B2
(45) Date of Patent: Dec. 5, 2023

(54) BEAM-BASED CONFIGURED GRANT—SMALL DATA TRANSFER OCCASIONS

(71) Applicant: QUALCOMM Incorporated, San Diego, CA (US)

(72) Inventors: Jing Lei, San Diego, CA (US); Linhai He, San Diego, CA (US); Yongjun Kwak, San Diego, CA (US); Huilin Xu, Temecula, CA (US); Krishna Kiran Mukkavilli, San Diego, CA (US); Wanshi Chen, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,904

(22) Filed: Jul. 28, 2021

(65) Prior Publication Data

US 2022/0039147 A1    Feb. 3, 2022

Related U.S. Application Data

(60) Provisional application No. 62/706,077, filed on Jul. 30, 2019.

(51) Int. Cl.
*H04W 72/23* (2023.01)
*H04W 72/1268* (2023.01)
(Continued)

(52) U.S. Cl.
CPC ............. *H04W 72/23* (2023.01); *H04W 8/24* (2013.01); *H04W 72/046* (2013.01); *H04W 72/1268* (2013.01); *H04W 72/54* (2023.01)

(58) Field of Classification Search
None
See application file for complete search history.

(56) References Cited

U.S. PATENT DOCUMENTS 11,012,878 B2 *   5/2021   Lee ..................... H04B 7/0478
11,159,929 B2 *  10/2021   Ye ........................ H04L 1/1671
(Continued)

FOREIGN PATENT DOCUMENTS

EP    3681055 A1        7/2020
EP    3913971 A1 *  11/2021   ............ H04B 7/0695
(Continued)

OTHER PUBLICATIONS

Asia Pacific Telecom., et al., "Beam Operation for CG-SDT," 3GPP TSG-RAN WG2 Meeting #113 electronic, 3GPP Draft, R2-2101837, 3rd Generation Partnership Project (3GPP), Mobile Competence Centre, 650, Route Des Lucioles, F-06921 Sophia-Antipolis Cedex, France, vol. RAN WG2, No. Electronic, Jan. 2021-Feb. 5, 2021, Jan. 15, 2021 (Jan. 15, 2021), pp. 1-3, XP051974700, Retrieved from https://www.3gpp.org/ftp/tsg_ran/WG2_RL2/TSGR2_113-e/Docs/R2-2101837.zip, R2-2101837 Beam-Operation for CG-SDT Final.docx.
(Continued)

*Primary Examiner* — Anh Vu H Ly
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, a configuration message indicating a configured grant-small data transfer (CG-SDT) group that includes the UE. The CG-SDT group is associated with a downlink beam of the base station and one or more CG-SDT occasions. The UE may transmit, to the base station and within the one or more CG-SDT occasions, an uplink communication, using an uplink beam
(Continued)

of the UE corresponding to a downlink beam of the UE, where the downlink beam of the UE is associated with the downlink beam of the base station used for transmitting at least one of the configuration message, a paging message, or a reference signal. Numerous other aspects are provided.

30 Claims, 10 Drawing Sheets

(51) Int. Cl.
*H04W 8/24* (2009.01)
*H04W 72/044* (2023.01)
*H04W 72/54* (2023.01)

(56) References Cited

U.S. PATENT DOCUMENTS

| | | | |
|---|---|---|---|
| 11,228,990 B2* | 1/2022 | Jeon | H04W 52/50 |
| 2018/0092125 A1 | 3/2018 | Sun et al. | |
| 2018/0242348 A1 | 8/2018 | Chendamarai Kannan et al. | |
| 2019/0068335 A1 | 2/2019 | Li et al. | |
| 2019/0320469 A1 | 10/2019 | Huang et al. | |
| 2019/0372639 A1 | 12/2019 | Lo et al. | |
| 2021/0105808 A1 | 4/2021 | Lei et al. | |
| 2021/0314102 A1 | 10/2021 | Li et al. | |
| 2021/0314999 A1 | 10/2021 | Chen et al. | |
| 2021/0315049 A1* | 10/2021 | Wei | H04W 56/0045 |
| 2021/0337625 A1* | 10/2021 | Tsai | H04W 76/19 |
| 2021/0410180 A1* | 12/2021 | Tsai | H04W 72/042 |
| 2022/0039146 A1* | 2/2022 | Lei | H04W 72/14 |
| 2022/0124780 A1* | 4/2022 | Lei | H04L 1/1671 |
| 2022/0278807 A1 | 9/2022 | Zhang et al. | |

FOREIGN PATENT DOCUMENTS

| | | | | |
|---|---|---|---|---|
| EP | 3934346 A1 * | 1/2022 | | |
| WO | WO-2019143406 A1 * | 7/2019 | | H04L 1/00 |
| WO | 2019144833 A1 | 8/2019 | | |
| WO | WO-2020032659 A1 | 2/2020 | | |
| WO | WO-2020134359 A1 | 7/2020 | | |
| WO | WO-2021207467 A1 * | 10/2021 | | |

OTHER PUBLICATIONS

Asia Pacific Telecom., et al., "CG-SDT Based on Beam Operation," 3GPP TSG-RAN WG2 Meeting #113 bis electronic, 3GPP Draft, R2-2103265, 3rd Generation Partnership Project (3GPP), Mobile Competence Centre, 650, Route Des Lucioles, F-06921 Sophia-Antipolis Cedex, France, vol. RAN WG2, No. Electronic, Apr. 12, 2021-Apr. 20, 2021, Apr. 1, 2021 (Apr. 1, 2021), pp. 1-6, XP051992038, Retrieved from https://www.3gpp.org/ftp/tsg_ran/WG2_RL2/TSGR2_113bis-e/Docs/R2-2103265.zip.

Catt, "Discussion on DL Beam Correspondence," 3GPP TSG RAN Meeting #82, 3GPP Draft, RP-182475_NRMMO_Beam Correspondance_V1, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 9, 2018 (Dec. 9, 2018), pp. 1-2, XP051553055, Retrieved from https://www.3gpp.org/ftp/TSG_RAN/TSG_RAN/TSGR_82/Docs/RP-182475.zip.

Huawei, et al., "RA and CG Based Small Data Transmission," 3GPP TSG RAN WG1 Meeting #104-e, 3GPP Draft, R1-2101267, 3rd Generation Partnership Project (3GPP), Mobile Competence Centre, 650, Route Des Lucioles, F-06921 Sophia-Antipolis Cedex, France, vol. RAN WG1, No. E-meeting, Jan. 25, 2021-Feb. 5, 2021, Jan. 19, 2021 (Jan. 19, 2021), pp. 1-7, XP051971477, Retrieved from https://www.3gpp.org/ftp/tsg_ran/WG1_RL1/TSGR1_104-e/Docs/R1-2101267.zip.

Partial International Search Report—PCT/US2021/071044—ISA/EPO—dated Dec. 6, 2021.

International Search Report and Written Opinion—PCT/US2021/071044—ISA/EPO—dated Mar. 22, 2022.

Sierra Wireless: "Pre-Configured UL Resources Design Considerations", 3GPP TSG RAN WG2 Meeting #103bis, 3GPP Draft, R2-1815078, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, 8 Pages, Sep. 28, 2018 (Sep. 28, 2018), XP051524445, Retrieved from the Internet: URL: http://www.3gpp.org/ftp/tsg%5Fran/WG2%5FRL2/TSGR2%5F103bis/Docs/R2%2D181507B%2Ezip [retrieved on Sep. 28, 2018], Section 1.

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. Ran WG1. No. V16.1.0, Apr. 3, 2020, XP051893821, pp. 1-156, p. 17, line 3-p. 18, line 8, paragraph [0010], Section 9, clauses 6, 9.2.1, 10.2 and 12, chapter 11.1 on p. 114-116.

* cited by examiner

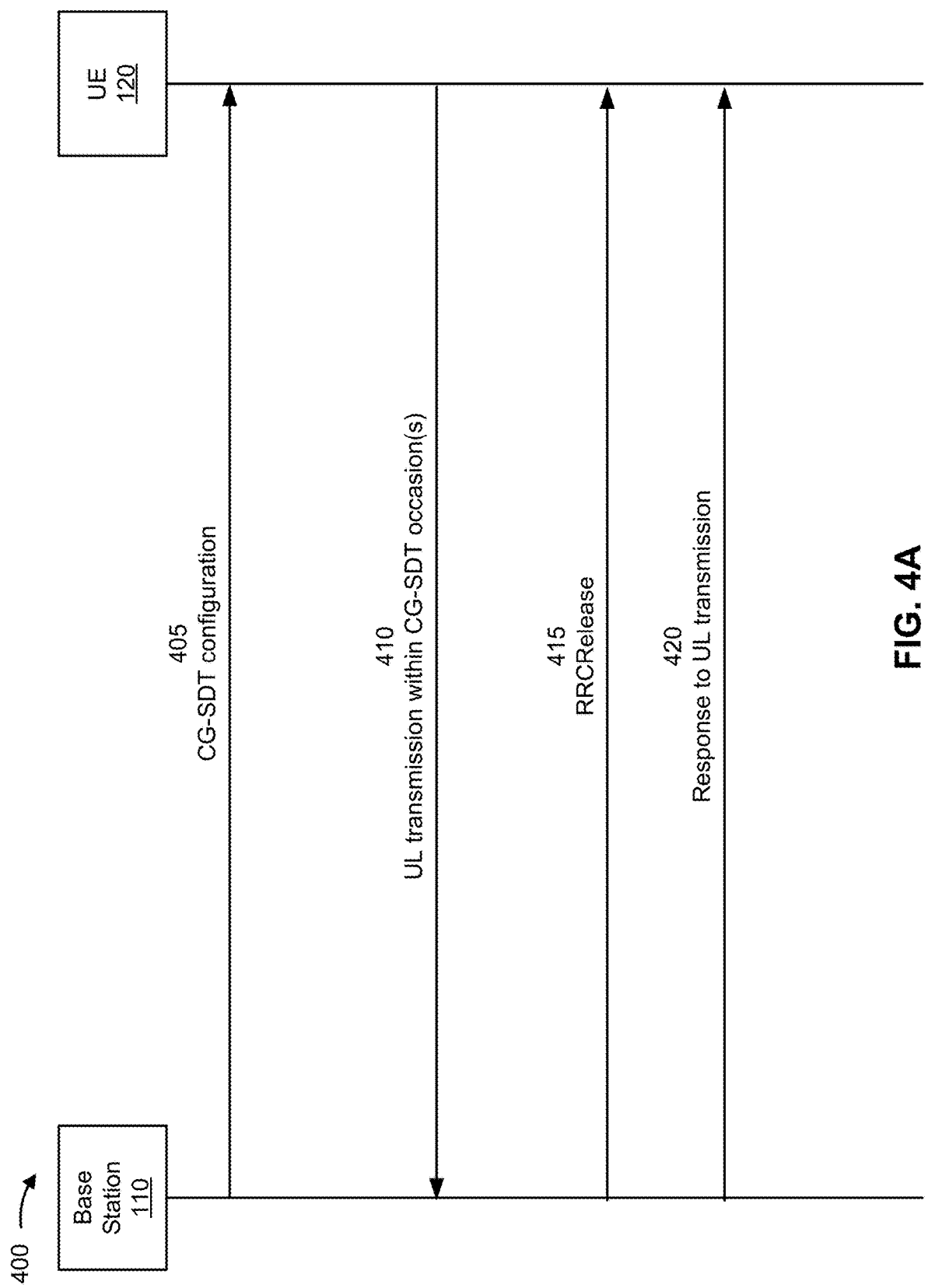

BEAM-BASED CONFIGURED GRANT—SMALL DATA TRANSFER OCCASIONS

CROSS-REFERENCE TO RELATED APPLICATION

This Patent Application claims priority to U.S. Provisional Patent Application No. 62/706,077, filed on Jul. 30, 2020, entitled "BEAM-BASED PRECONFIGURED UPLINK RESOURCE OCCASIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for beam-based configured grant-small data transfer occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. New Radio (NR) is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, a configuration message indicating a configured grant-small data transfer (CG-SDT) group that includes the UE, wherein the CG-SDT group is associated with a downlink beam of the base station and one or more CG-SDT occasions. The method may further include transmitting, to the base station and within the one or more CG-SDT occasions, an uplink communication, using an uplink beam of the UE corresponding to a downlink beam of the UE, wherein the downlink beam of the UE is associated with the downlink beam of the base station used for transmitting at least one of the configuration message, a paging message, or a reference signal.

Some aspects described herein relate to a method of wireless communication performed by a base station. The method may include transmitting, to a UE, a configuration message indicating a CG-SDT group that includes the UE, wherein the CG-SDT group is associated with a downlink beam of the base station and one or more CG-SDT occasions. The method may further include receiving, from the UE and within the one or more CG-SDT occasions, an uplink communication, using a spatial filter corresponding to the downlink beam of the base station.

Some aspects described herein relate to a method of wireless communication performed by a UE. The method may include transmitting, to a base station, a scheduling request for one or more CG-SDT occasions. The method may further include transmitting, to the base station, measurements related to one or more beam candidates for use in the one or more CG-SDT occasions.

Some aspects described herein relate to a method of wireless communication performed by a base station. The method may include receiving, from a UE, a scheduling request associated with one or more CG-SDT occasions. The method may further include receiving, from the UE, measurements related to one or more beam candidates for use in the one or more CG-SDT occasions.

Some aspects described herein relate to an apparatus for wireless communication at a UE. The apparatus may include a memory and one or more processors coupled with the memory. The one or more processors may be configured to receive, from a base station, a configuration message indicating a CG-SDT group that includes the UE, wherein the CG-SDT group is associated with a downlink beam of the base station and one or more CG-SDT occasions. The one or more processors may be further configured to transmit, to the base station and within the one or more CG-SDT occasions, an uplink communication, using an uplink beam of the UE corresponding to a downlink beam of the UE, wherein the downlink beam of the UE is associated with the downlink beam of the base station used for transmitting at least one of the configuration message, a paging message, or a reference signal.

Some aspects described herein relate to an apparatus for wireless communication at a base station. The apparatus may include a memory and one or more processors coupled with the memory. The one or more processors may be configured to transmit, to a UE, a configuration message indicating a CG-SDT group that includes the UE, wherein the CG-SDT group is associated with a downlink beam of the base station and one or more CG-SDT occasions. The one or more processors may be further configured to receive, from the UE and within the one or more CG-SDT occasions, an uplink communication, using a spatial filter corresponding to the downlink beam of the base station.

Some aspects described herein relate to an apparatus for wireless communication at a UE. The apparatus may include a memory and one or more processors coupled with the memory. The one or more processors may be configured to transmit, to a base station, a scheduling request for one or more CG-SDT occasions. The one or more processors may be further configured to transmit, to the base station, measurements related to one or more beam candidates for use in the one or more CG-SDT occasions.

Some aspects described herein relate to an apparatus for wireless communication at a base station. The base station may include a memory and one or more processors coupled with the memory. The one or more processors may be configured to receive, from a UE, a scheduling request associated with one or more CG-SDT occasions. The one or more processors may be further configured to receive, from the UE, measurements related to one or more beam candidates for use in the one or more CG-SDT occasions.

Some aspects described herein relate to a non-transitory computer-readable medium that stores a set of instructions for wireless communication by a UE. The set of instructions, when executed by one or more processors of the UE, may cause the UE to receive, from a base station, a configuration message indicating a CG-SDT group that includes the UE, wherein the CG-SDT group is associated with a downlink beam of the base station and one or more CG-SDT occasions. The set of instructions, when executed by one or more processors of the UE, may further cause the UE to transmit, to the base station and within the one or more CG-SDT occasions, an uplink communication, using an uplink beam of the UE corresponding to a downlink beam of the UE, wherein the downlink beam of the UE is associated with the downlink beam of the base station used for transmitting at least one of the configuration message, a paging message, or a reference signal.

Some aspects described herein relate to a non-transitory computer-readable medium that stores a set of instructions for wireless communication by a base station. The set of instructions, when executed by one or more processors of the base station, may cause the base station to transmit, to a UE, a configuration message indicating a CG-SDT group that includes the UE, wherein the CG-SDT group is associated with a downlink beam of the base station and one or more CG-SDT occasions. The set of instructions, when executed by one or more processors of the base station, may further cause the base station to receive, from the UE and within the one or more CG-SDT occasions, an uplink communication, using a spatial filter corresponding to the downlink beam of the base station.

Some aspects described herein relate to a non-transitory computer-readable medium that stores a set of instructions for wireless communication by a UE. The set of instructions, when executed by one or more processors of the UE, may cause the UE to transmit, to a base station, a scheduling request for one or more CG-SDT occasions. The set of instructions, when executed by one or more processors of the UE, may further cause the UE to transmit, to the base station, measurements related to one or more beam candidates for use in the one or more CG-SDT occasions.

Some aspects described herein relate to a non-transitory computer-readable medium that stores a set of instructions for wireless communication by a base station. The set of instructions, when executed by one or more processors of the base station, may cause the base station to receive, from a UE, a scheduling request associated with one or more CG-SDT occasions. The set of instructions, when executed by one or more processors of the base station, may further cause the base station to receive, from the UE, measurements related to one or more beam candidates for use in the one or more CG-SDT occasions.

Some aspects described herein relate to an apparatus for wireless communication. The apparatus may include means for receiving, from a base station, a configuration message indicating a CG-SDT group that includes the apparatus, wherein the CG-SDT group is associated with a downlink beam of the base station and one or more CG-SDT occasions. The apparatus may further include means for transmitting, to the base station and within the one or more CG-SDT occasions, an uplink communication, using an uplink beam of the apparatus corresponding to a downlink beam of the apparatus, wherein the downlink beam of the apparatus is associated with the downlink beam of the base station used for transmitting at least one of the configuration message, a paging message, or a reference signal.

Some aspects described herein relate to an apparatus for wireless communication. The apparatus may include means for transmitting, to a UE, a configuration message indicating a CG-SDT group that includes the UE, wherein the CG-SDT group is associated with a downlink beam of the apparatus and one or more CG-SDT occasions. The apparatus may further include means for receiving, from the UE and within the one or more CG-SDT occasions, an uplink communication, using a spatial filter corresponding to the downlink beam of the apparatus.

Some aspects described herein relate to an apparatus for wireless communication. The apparatus may include means for transmitting, to a base station, a scheduling request for one or more CG-SDT occasions. The apparatus may further include means for transmitting, to the base station, measurements related to one or more beam candidates for use in the one or more CG-SDT occasions.

Some aspects described herein relate to an apparatus for wireless communication. The apparatus may include means for receiving, from a UE, a scheduling request associated with one or more CG-SDT occasions. The apparatus may further include means for receiving, from the UE, measurements related to one or more beam candidates for use in the one or more CG-SDT occasions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A and 4B are diagrams illustrating examples associated with configuring beam-based configured grant-small data transfer (CG-SDT) occasions, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
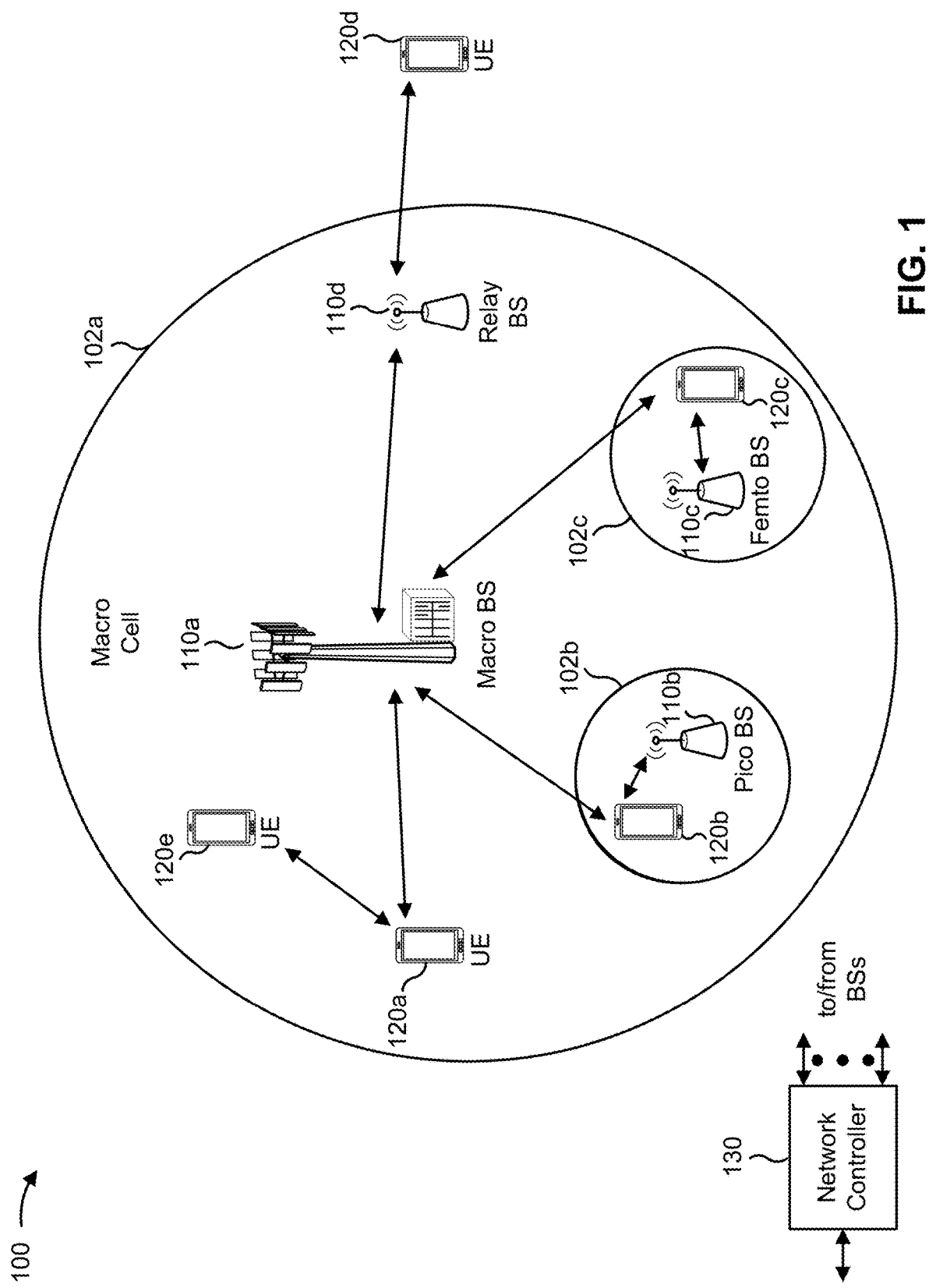
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave," "mmW," or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
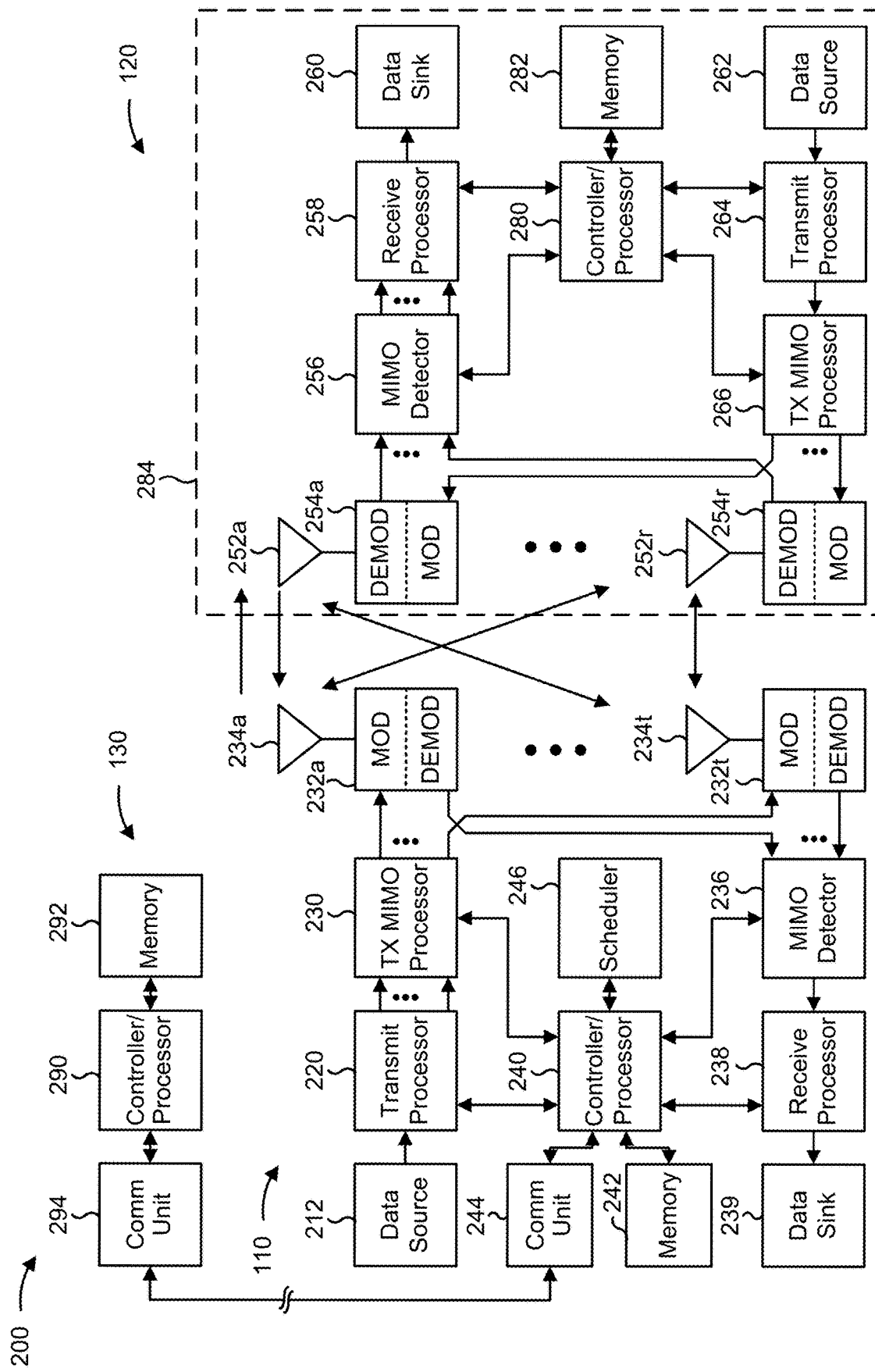
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A, 4B, and 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A, 4B, and 5-9).

The controller/processor 240 of the base station 110, the controller/processor 280 of the UE 120, and/or any other component(s) of FIG. 2 may perform one or more techniques associated with beam-based configured grant-small data transfer (CG-SDT) occasions, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) may include means for receiving, from a base station (e.g., the base station 110), a configuration message indicating a CG-SDT group that includes the UE, wherein the CG-SDT group is associated with a downlink beam of the base station and one or more CG-SDT occasions; and/or means for transmitting, to the base station and within the one or more CG-SDT occasions, an uplink communication, using an uplink beam of the UE corresponding to a downlink beam of the UE, wherein the downlink beam of the UE is associated with the downlink beam of the base station used for transmitting at least one of the configuration message, a paging message, or a reference signal. The means for the UE to perform operations described herein may include, for example, one or more of antenna 252, modem 254, MIMO detector 256, receive processor 258, transmit processor 264, TX MIMO processor 266, controller/processor 280, or memory 282.

Additionally, or alternatively, a UE (e.g., the UE 120) may include means for transmitting, to a base station (e.g., the base station 110), a scheduling request for one or more CG-SDT occasions; and/or means for transmitting, to the base station, measurements related to one or more beam candidates for use in the one or more CG-SDT occasions. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110) may include means for transmitting, to a UE (e.g., the UE 120), a configuration message indicating a CG-SDT group that includes the UE, wherein the CG-SDT group is associated with a downlink beam of the base station and one or more CG-SDT occasions; and/or means for receiving, from the UE and within the one or more CG-SDT occasions, an uplink communication, using a spatial filter corresponding to the downlink beam of the base station. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

Additionally, or alternatively, a base station (e.g., the base station 110) may include means for receiving, from a UE (e.g., the UE 120)), a scheduling request associated with one or more CG-SDT occasions; and/or means for receiving, from the UE, measurements related to one or more beam candidates for use in the one or more CG-SDT occasions. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
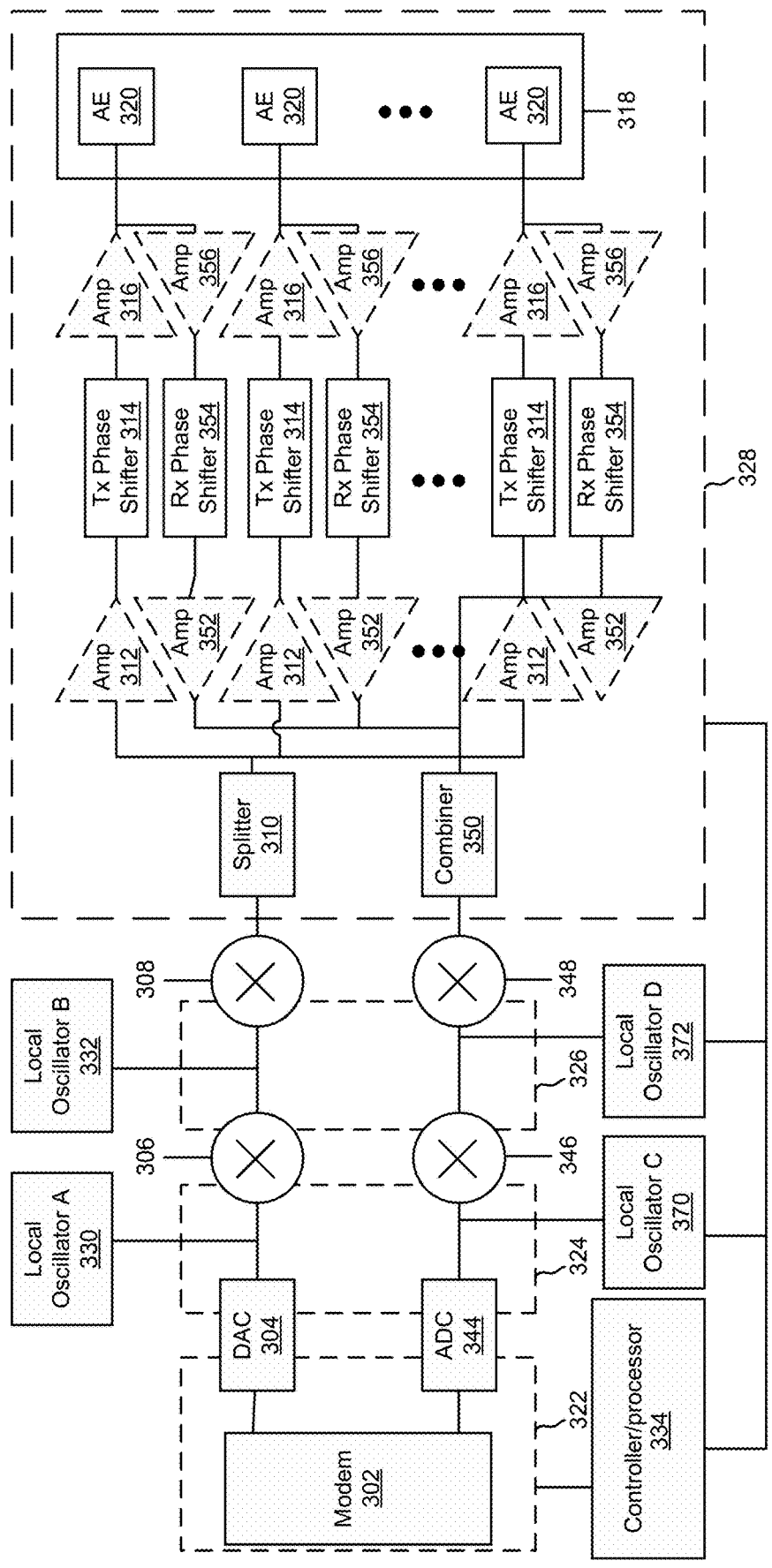
FIG. 3 is a diagram illustrating an example of beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312 and 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes)

and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Some UEs may operate using fewer antennas (e.g., fewer Rx antennas) and/or reduced bandwidth (e.g., operating in a 5-20 MHz range rather than a 100 MHz bandwidth) in order to conserve battery power. Such UEs may include smart devices (such as smart watches and/or fitness trackers, among other examples), industrial sensors, and/or video surveillance devices, among other examples, and may be referred to as reduced capacity UEs ("RedCap UEs") and/or "NR-light UEs."

In order to conserve battery power of a RedCap UE, a base station may provide CG-SDT occasions in which a RedCap UE may communicate with the base station, even when the RedCap UE is in an idle mode or an inactive state. As used herein, a CG-SDT occasion may also be referred to as a preconfigured uplink resource (PUR) occasion. For example, 3GPP specifications for 5G may use the term CG-SDT while 3GPP specifications for LTE use the term PUR.

Existing 3GPP specifications and/or other standards for PUR configurations are limited. For example, 3GPP specifications do not allow for PUR occasions to be shared by more than two UEs. Therefore, a base station may use significant amount of spectrum when configuring a plurality of UEs with PUR occasions.

Techniques and apparatuses described herein allow a base station (e.g., base station 110) to configure a group of UEs (e.g., including UE 120) for one or more CG-SDT occasions that correspond to downlink beams (e.g., based at least in part on downlink reference signals, such as channel state information reference signals (CSI-RSs), synchronization signal blocks (SSBs), and/or tracking reference signals (TRSs), among other examples). Accordingly, the base station 110 and the group of UEs reduce network overhead and resource use by improving spectral efficiency of CG-SDT transmissions. As a result, network congestion is reduced, which conserves power at the base station 110 and at the group of UEs by reducing failed receptions, failed decoding, and retransmissions.

Additionally, or alternatively, techniques and apparatuses described herein allow the group of UEs to request that the base station 110 configure CG-SDT occasions when reporting beam measurements to the base station 110. Accordingly, the base station 110 improves reliability and/or quality of communications by selecting optimal beams to use for the CG-SDT occasions. Moreover, in some aspects, the group of UEs may multiplex scheduling requests for CG-SDT occasions with the beam measurements in order to reduce the signaling overhead used to configure the CG-SDT occasions, which conserves power and processing resources at the base station 110 and at the group of UEs. Additionally, as a result, network congestion is reduced, which conserves power at the base station 110 and at the group of UEs by reducing failed receptions, failed decoding, and retransmissions.

FIG. 4A is a diagram illustrating an example 400 associated with configuring beam-based CG-SDT occasions, in accordance with the present disclosure. As shown in FIG. 4A, example 400 includes communication between a base station 110 and a UE 120. In some aspects, the base station 110 and the UE 120 may be included in a wireless network, such as wireless network 100. In some aspects, the base station 110 and the UE 120 may communicate on a 5G and/or other NR network. Accordingly, the base station 110 and the UE 120 may use beamforming as described in connection with FIG. 3.

As shown in connection with reference number 405, the base station 110 may transmit, and the UE 120 may receive, a configuration message indicating a CG-SDT group that includes the UE 120. For example, the base station 110 may address the configuration message to a group radio network temporary identifier (G-RNTI), or to a plurality of RNTIs, associated with a plurality of UEs in the group. In some aspects, the CG-SDT group may be associated with a downlink beam of the base station 110 and one or more CG-SDT occasions. For example, the one or more CG-SDT occasions may be associated with the downlink beam as described in connection with FIG. 5.

In example 400, the base station 110 transmits the configuration message multiplexed with, or at least adjacent in time with, a release of a radio resource control (RRC) connection with the UE 120 (e.g., an RRCRelease message as defined in 3GPP specifications and/or another standard). Accordingly, in some aspects, the UE 120 may enter an inactive state or an idle mode.

In some aspects, the configuration message may be unicast to the UE 120. For example, the configuration message may include only an RNTI of the UE 120. In such aspects, the configuration message may include additional information for timing advance (TA) validation for the UE 120. For example, the configuration message may indicate a reference signal that the UE 120 may measure to determine the TA. As an alternative, the configuration message may be multicast to a group of UEs including the UE 120. For example, the configuration message may include a G-RNTI and/or a plurality of RNTIs (e.g., as described above). In such aspects, the configuration message may include additional information for TA validation for a plurality of UEs in the group. For example, the configuration message may indicate one or more reference signals that each UE, of the plurality of UEs, may measure to determine a corresponding TA for the UE.

In some aspects, the downlink beam may be associated with a downlink reference signal broadcast by the base station 110. For example, the downlink reference signal may include an SSB, a TRS, a CSI-RS, and/or another reference signal. Accordingly, the downlink reference signal may indicate a spatial filter associated with (and used by the UE 120 to receive) the downlink beam.

In some aspects, the UE 120 may have measured one or more downlink beam candidates transmitted by the base station 110. Accordingly, the UE 120 may have transmitted, and the base station 110 may have received, measurements related to the one or more beam candidates and a scheduling request (SR) for the one or more CG-SDT occasions. In some aspects, the measurements may be included in a report associated with the one or more beam candidates. For example, the UE 120 may transmit, and the base station 110 may receive, a channel state information (CSI) report based at least in part on the measurements.

In some aspects, the base station 110 may have transmitted, and the UE 120 may have received, one or more measurement thresholds. For example, the base station 110 may indicate (e.g., using RRC signaling; system information (SI), such as a system information block (SIB) message; and/or another signal), to the UE 120, one or more thresholds (e.g., represented by SCG-SDT) that the measurements should satisfy before being transmitted to the base station 110. Accordingly, the measurements transmitted to the base station 110 may satisfy the one or more measurement thresholds configured for corresponding downlink reference signals and beam indices. In some aspects, the one or more measurement thresholds may be based at least in part on a bandwidth associated with the base station 110, a cell size associated with the base station 110, a capability associated with the UE 120, or a capability associated with the base station 110. For example, the base station 110 may decrease the one or more thresholds when serving a UE with greater transmit power capability, when the base station 110 has additional antennas for reception, when the cell size is smaller, and/or when the bandwidth is smaller. Similarly, the base station 110 may increase the one or more thresholds when serving a UE with lower transmit power capability, when the base station 110 has fewer antennas for reception, when the cell size is larger, and/or when the bandwidth is larger.

Additionally, or alternatively, the base station 110 may transmit, and the UE 120 may receive, an upper bound on a number of reported beams. For example, the base station 110 may indicate (e.g., using RRC signaling; SI, such as an SIB message; and/or another signal), to the UE 120, the upper bound (e.g., represented by $K_{max}$). Accordingly, the one or more beam candidates reported by the UE 120 may not exceed the upper bound. For example, the UE 120 may eliminate any beam candidates with weaker measurements in order to satisfy the upper bound. In aspects where the base station 110 further transmits one or more measurement thresholds (e.g., as described above), the UE 120 may eliminate any beam candidates that satisfy the one or more measurement thresholds by smaller margins in order to satisfy the upper bound. In some aspects, the upper bound may be based at least in part on a capability associated with the UE 120. For example, the base station 110 may increase the upper bound when serving a UE with greater transmit power capability. Similarly, the base station 110 may decrease the upper bound when serving a UE with lower transmit power capability.

In some aspects, the SR may indicate a maximum transport block size (TBS), a maximum MCS, a range of periodicities for the one or more CG-SDT occasions, and/or the measurements corresponding to the one or more beam candidates. For example, as described above, the UE 120 may multiplex the measurements with the SR. Additionally, or alternatively, the UE 120 may determine a maximum TBS and/or a maximum MCS based at least in part on a capability of the UE 120 and/or the measurements. For example, the UE 120 may request a smaller maximum TBS and/or a smaller maximum MCS when the UE 120 has a lower transmit power capability and/or when the measurements are smaller. Additionally, or alternatively, the UE 120 may determine a preferred range of periodicities based at least in part on a data requirement of the UE 120. For example, the UE 120 may request more frequent periodicities when the UE 120 expects to transmit more data to the base station 110 and/or when the UE 120 expects to transmit data more frequently to the base station 110.

In some aspects, as described above, the UE 120 may multiplex the SR with the measurements. As an alternative, the UE 120 may transmit the measurements separately from the SR. For example, the UE 120 may transmit, and the base station 110 may receive, a first message with the measurements (and/or a report based at least in part on the measurements). Moreover, the UE 120 may transmit, and the base station 110 may receive, a second message with the SR.

In some aspects, the UE 120 may transmit the SR based at least in part on receiving a query from the base station 110. For example, the UE 120 may transmit the SR in response to a query from the base station 110, where the query is based at least in part on capability signaling sent from the UE 120 to the base station 110. Additionally, or alternatively, the UE 120 may transmit the SR with a capability message. For example, the UE 120 may multiplex the SR with the capability message sent from the UE 120 to the base station 110.

As shown in connection with reference number 410, the UE 120 may transmit, within the one or more CG-SDT occasions, an uplink communication, using an uplink beam corresponding to the downlink beam. For example, the UE 120 may transmit a physical uplink shared channel (PUSCH) message and/or other uplink data to the base station 110. Accordingly, the base station 110 may receive, within the one or more CG-SDT occasions, the uplink communication, using a spatial filter corresponding to the downlink beam. For example, the base station 110 may apply a spatial filter for reception that is determined based at least in part on the downlink beam (e.g., which may correspond to a downlink reference signal, such as a CSI-RS, a TRS, an SSB, and/or another reference signal, as described above).

In some aspects, the UE 120 may determine the one or more CG-SDT occasions based at least in part on a look-up table or a closed-form formula. For example, the configuration message may include an index and/or one or more other inputs that the UE 120 may apply to the look-up table or the closed-form formula to determine the one or more CG-SDT occasions. Additionally, or alternatively, the UE 120 may determine the one or more CG-SDT occasions based at least in part on one or more parameters. For example, the base station 110 may provide, and/or the UE 120 may determine, the one or more parameters. In some aspects, the one or more parameters may include beam measurements of downlink reference signals, a periodicity associated with the one or more CG-SDT occasions, a time offset associated with the one or more CG-SDT occasions, or a time duration of the one or more CG-SDT occasions. For example, the UE 120 may determine the beam measurements and the periodicity and receive, from the base station 110, the time duration and the offset, and the UE 120 may input these parameters into the look-up table or the closed-form formula to determine the one or more CG-SDT occasions. In some aspects, the table or formula may be indicated by at least one of system information or RRC signaling.

In some aspects, the UE 120 may validate uplink TA on an uplink carrier before transmitting the uplink communication. For example, the UE 120 may assess at least one of variation of one or more downlink beam measurements or a status of a TA timer maintained by the UE 120. Accordingly, the UE 120 may measure the downlink reference signal and/or verify a TA timer before transmitting the uplink communication (e.g., using a waveform indicated by at least one of system information, RRC signaling, or the configuration message).

As shown in connection with reference number 415, the base station 110 may release an RRC connection with the UE 120 (e.g., using an RRCRelease message, as defined in 3GPP specifications and/or another standard). Accordingly, in some aspects, the UE 120 may re-enter the inactive state and/or the idle mode after transmitting the uplink communication.

Additionally, or alternatively, as shown in connection with reference number 420, the base station 110 may transmit, and the UE 120 may receive, a response to the uplink communication on a downlink channel associated with the one or more CG-SDT occasions. For example, the base station 110 may transmit, and the UE 120 may receive, a physical downlink control channel (PDCCH) response. In some aspects, the base station 110 may transmit, and the UE 120 may receive, downlink data on a downlink channel associated with the one or more CG-SDT occasions. For example, the base station 110 may transmit, and the UE 120 may receive, data on a physical downlink shared channel (PDSCH).

By using techniques as described in connection with FIG. 4A, the base station 110 may configure a group of UEs (e.g., including UE 120) for one or more CG-SDT occasions that correspond to downlink beams. Accordingly, the base station 110 and the group of UEs reduce network overhead and resource use by improving spectral efficiency of CG-SDT transmissions.

Additionally, as described above in connection with reference number 405, the UE 120 may request that the base station 110 configure the one or more CG-SDT occasions when reporting beam measurements to the base station 110. Accordingly, the base station 110 improves reliability and/or quality of communications by selecting optimal beams to use for the CG-SDT occasions.

Moreover, in some aspects, as described above in connection with reference number 405, the UE 120 may multiplex scheduling requests for CG-SDT occasions with the beam measurements in order to reduce the signaling overhead used to configure the one or more CG-SDT occasions, such that the base station 110 and the UE 120 reduce network overhead and resource consumption.

As indicated above, FIG. 4A is provided as an example. Other examples may differ from what is described with respect to FIG. 4A.

Figure 4B:
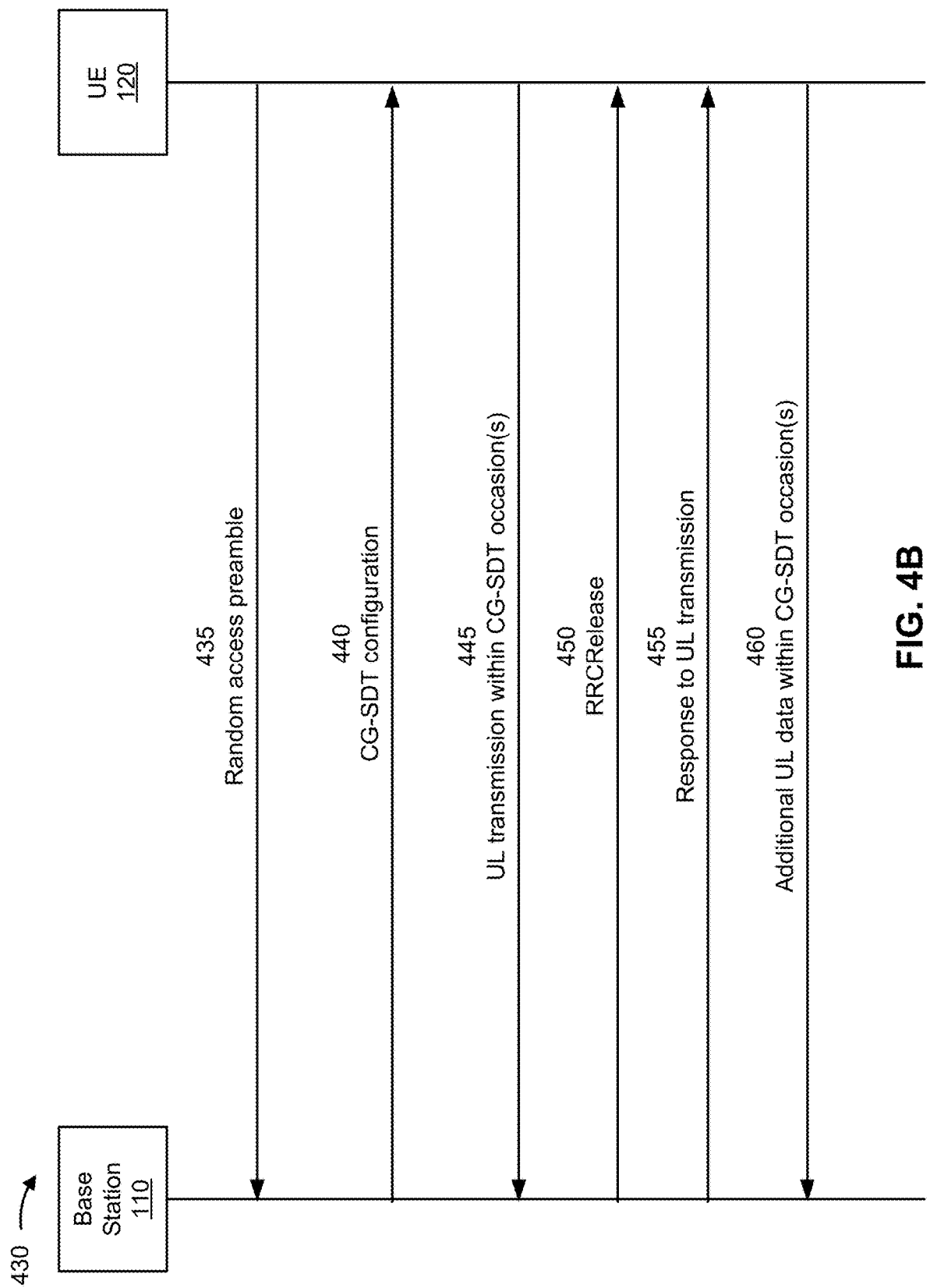

FIG. 4B is a diagram illustrating an example 430 associated with configuring beam-based CG-SDT occasions, in accordance with the present disclosure. As shown in FIG. 4B, example 430 includes communication between a base station 110 and a UE 120. In some aspects, the base station 110 and the UE 120 may be included in a wireless network, such as wireless network 100. In some aspects, the base station 110 and the UE 120 may communicate on a 5G and/or other NR network. Accordingly, the base station 110 and the UE 120 may use beamforming as described in connection with FIG. 3. Example 430 is similar to example 400 but includes the UE 120 transmitting an SR for the CG-SDT occasions while in an inactive state or an idle mode, rather than in a connected state as described in connection with FIG. 4A.

As shown in connection with reference number 435, the UE 120 may transmit, and the base station 110 may receive, a random access preamble. In some aspects, the UE 120 may have measured one or more downlink beam candidates transmitted by the base station 110. Accordingly, the UE 120 may transmit, and the base station 110 may receive, measurements related to the one or more beam candidates and an SR for the one or more CG-SDT occasions. In some aspects, the UE 120 may multiplex the measurements and/or the SR with the random access preamble. As an alternative, the UE 120 may transmit the measurements and/or the SR adjacent in time with the random access preamble. For example, the UE 120 may transmit a first message with the random access preamble and a second message with the measurements and the SR. In another example, the UE 120 may transmit a first message with the random access preamble, a second message with the measurements, and a third message with the SR. In yet another example, the UE 120 may transmit a first message with the random access preamble multiplexed with one of the measurements and the SR, and a second message with the other of the measurements and the SR.

In some aspects, the measurements may be included in a report associated with the one or more beam candidates. For example, the UE 120 may transmit, and the base station 110 may receive, a CSI report based at least in part on the measurements.

In some aspects, and as described in connection with FIG. 4A, the base station 110 may have transmitted, and the UE 120 may have received, one or more measurement thresholds. Accordingly, the measurements transmitted to the base station 110 may satisfy the one or more measurement thresholds configured for corresponding downlink reference signals and beam indices. Additionally, or alternatively, and as described in connection with FIG. 4A, the base station 110 may transmit, and the UE 120 may receive, an upper bound on a number of reported beams. Accordingly, the one or more beam candidates reported by the UE 120 may not exceed the upper bound.

In some aspects, and as described in connection with FIG. 4A, the SR may indicate a maximum TBS, a maximum MCS, a range of periodicities for the one or more CG-SDT occasions, and/or the measurements corresponding to the one or more beam candidates.

In some aspects, the UE 120 may transmit the SR based at least in part on receiving a query from the base station 110. For example, the UE 120 may transmit the SR in response to a query from the base station 110, where the query is based at least in part on capability signaling sent from the UE 120 to the base station 110. Additionally, or alternatively, the UE 120 may transmit the SR with a capability message. For example, the UE 120 may multiplex the SR with the capability message sent from the UE 120 to the base station 110.

As shown in connection with reference number 440, the base station 110 may transmit, and the UE 120 may receive, a configuration message indicating a CG-SDT group that includes the UE 120. For example, the base station 110 may transmit the configuration message as described in connection with FIG. 4A. In some aspects, the one or more CG-SDT occasions may be associated with the downlink beam as described in connection with FIG. 5.

In some aspects, the base station 110 transmits the configuration message multiplexed with, or at least adjacent in time with, a random access response to the UE 120 (e.g., as defined in 3GPP specifications and/or another standard).

In some aspects, the configuration message may be unicast to the UE 120. For example, the configuration message may include only an RNTI of the UE 120. In such aspects, the configuration message may include additional information related to a TA for the UE 120. For example, the configuration message may include a reference signal that the UE 120 may measure to determine the TA. As an alternative, the configuration message may be multicast to a group of UEs including the UE 120. For example, the configuration message may indicate a G-RNTI and/or a plurality of RNTIs. In such aspects, the configuration message may include additional information related to TAs for a plurality of UEs in the group. For example, the configuration message may indicate one or more reference signals that each, of the plurality of UEs, may measure to determine a corresponding TA for the UE.

In some aspects, the downlink beam may be associated with a downlink reference signal broadcast by the base station 110. For example, the downlink reference signal may include an SSB, a TRS, a CSI-RS, and/or another reference signal. Accordingly, the downlink reference signal may indicate a spatial filter associated with (and used by the UE 120 to receive) the downlink beam.

As shown in connection with reference number 445, the UE 120 may transmit, within the one or more CG-SDT occasions, an uplink communication, using an uplink beam corresponding to the downlink beam. For example, the UE 120 may transmit a PUSCH message or other uplink data to the base station 110. Accordingly, the base station 110 may receive, within the one or more CG-SDT occasions, the uplink communication, using a spatial filter corresponding to the downlink beam. For example, the base station 110 may apply a spatial filter for reception that is determined based at least in part on the downlink beam (e.g., which may correspond to a downlink reference signal, such as a CSI-RS, a TRS, an SSB, and/or another reference signal, as described above).

In some aspects, and as described in connection with FIG. 4A, the UE 120 may determine the one or more CG-SDT occasions based at least in part on a look-up table or a closed-form formula. In some aspects, the table or formula may be indicated by at least one of system information or RRC signaling. Additionally, or alternatively, in some aspects and as described in connection with FIG. 4A, the UE 120 may validate uplink TA on an uplink carrier before transmitting the uplink communication (e.g., using a waveform indicated by at least one of system information, RRC signaling, or the configuration message).

As shown in connection with reference number 450, the base station 110 may release an RRC connection with the UE 120 (e.g., using an RRCRelease message, as defined in 3GPP specifications and/or another standard). Accordingly, in some aspects, the UE 120 may enter the inactive state or the idle mode after transmitting the uplink communication.

Additionally, or alternatively, as shown in connection with reference number 455, the base station 110 may transmit, and the UE 120 may receive, a response to the uplink communication on a downlink channel associated with the one or more CG-SDT occasions. For example, the base station 110 may transmit, and the UE 120 may receive, a PDCCH response. In some aspects, the base station 110 may transmit, and the UE 120 may receive, downlink data on a downlink channel associated with the one or more CG-SDT occasions. For example, the base station 110 may transmit, and the UE 120 may receive, data on a PDSCH.

In some aspects, and as shown in connection with reference number 460, the UE 120 may transmit additional uplink data within the one or more CG-SDT occasions. As described in connection with FIG. 5, the one or more CG-SDT occasions may be associated with one or more association periods within an association pattern period. Accordingly, the UE 120 may transmit additional uplink data within the one or more CG-SDT occasions before expiry of the one or more association periods.

By using techniques as described in connection with FIG. 4B, the base station 110 may configure a group of UEs (e.g., including UE 120) for one or more CG-SDT occasions that correspond to downlink beams. Accordingly, the base station 110 and the group of UEs reduce network overhead and resource use by improving spectral efficiency of CG-SDT transmissions.

Additionally, as described above in connection with reference number 435, the UE 120 may request that the base station 110 configure the one or more CG-SDT occasions when reporting beam measurements to the base station 110. Accordingly, the base station 110 improves reliability and/or quality of communications by selecting optimal beams to use for the CG-SDT occasions.

Moreover, in some aspects, as described above in connection with reference number 435, the UE 120 may multiplex scheduling requests for CG-SDT occasions with the beam measurements in order to reduce the signaling overhead used to configure the one or more CG-SDT occasions, such that the base station 110 and the UE 120 reduce network overhead and resource consumption.

As indicated above, FIG. 4B is provided as an example. Other examples may differ from what is described with respect to FIG. 4B.

Figure 5:
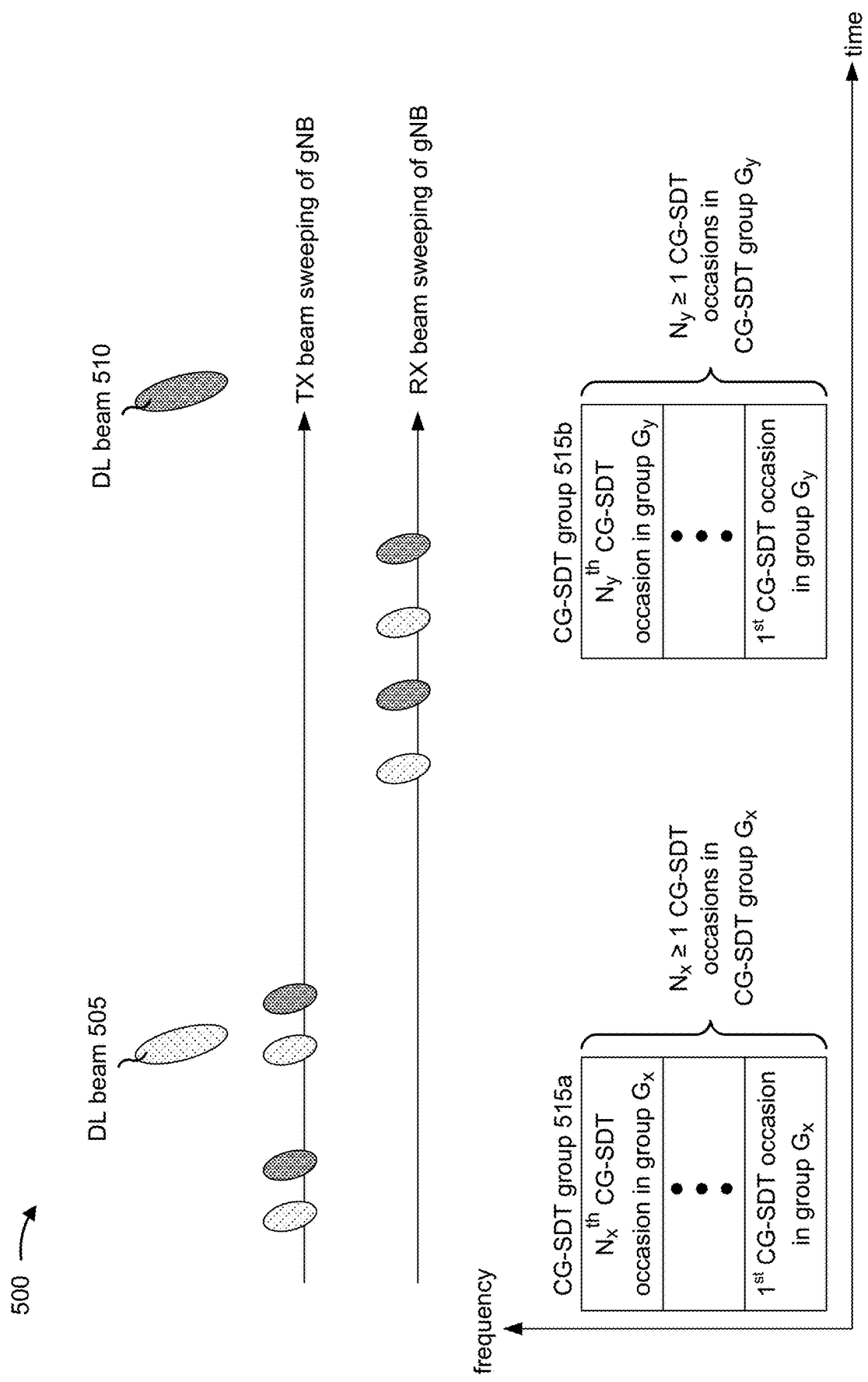
FIG. 5 is a diagram illustrating an example associated with beam-based CG-SDT occasions, in accordance with the present disclosure.

FIG. 5 is a diagram illustrating an example 500 associated with beam-based CG-SDT occasions, in accordance with the present disclosure. As shown in FIG. 5, example 500 includes multiple downlink beams from a gNB (e.g., base station 110). In some aspects, the downlink beams may be associated with one or more downlink reference signals (e.g., TRSs, CSI-RSs, SSBs, and/or other reference signals) used in communication between the gNB and a UE (e.g., UE 120). Accordingly, the gNB may sweep (e.g., when transmitting the downlink reference signal(s)) the downlink beams (shown as DL beam 505 and DL beam 510 in example 500). Similarly, as shown in FIG. 5, the gNB may sweep spatial receive filters corresponding to the downlink beams when received from UEs. In some aspects, the gNB and the UE 120 may be included in a wireless network, such as wireless network 100.

As shown in FIG. 5, the base station 110 may configure different CG-SDT for different groups of UEs, and each CG-SDT group may be associated with a corresponding downlink beam of the base station 110 and one or more corresponding CG-SDT occasions. For example, for each CG-SDT group, the base station 110 may transmit, and the UEs in the group may receive, a configuration message as described in connection with FIGS. 4A and/or 4B.

As further shown in FIG. 5, each downlink beam may be associated with one or more CG-SDT occasions. In example 500, DL beam 505 is associated with $N_x$ CG-SDT occasions for CG-SDT group 515a (also referred to as "group Gx") that includes one or more UEs. Similarly, DL beam 510 is associated with $N_y$ CG-SDT occasions for CG-SDT group 515b (also referred to as "group $G_y$") that includes one or more UEs. The CG-SDT occasions for a CG-SDT group may have resource sizes that are the same and/or different from each other. Similarly, the CG-SDT occasions for a CG-SDT group may use the same MCS and/or different MCSs.

In some aspects, each downlink beam (e.g., DL beam 505a and/or DL beam 505b) may be associated with the one or more CG-SDT occasions (e.g., $N_x$ CG-SDT occasions in CG-SDT group 515a and/or $N_y$ CG-SDT occasions in CG-SDT group 515b, respectively) according to one or more association periods within an association pattern period. As used herein, an "association period" may refer to a smallest value in a set determined by a configuration period (e.g., as defined in 3GPP specifications and/or another standard) such that a downlink reference signal (e.g., a TRS, a CSI-RS, an SSB, and/or another reference signal) is mapped at least once to the one or more CG-SDT occasions within the association period. Moreover, as used herein, an "association pattern period" may refer to a pattern of one or more association periods and may be determined such that a pattern, between the one or more CG-SDT occasions and transmission of the downlink reference signal, repeats within a threshold (e.g., 160 ms, 80 ms, and so on). In some aspects, each of the one or more association periods may include one or more configuration periods for the one or more CG-SDT occasions. As used herein, a "configuration period" may refer to a period in which the gNB and a corresponding UE configure the one or more CG-SDT occasions. In some aspects, each of the one or more configuration periods may be an integer multiple of a burst period associated with the downlink reference signal.

Accordingly, a UE may transmit, within the one or more CG-SDT occasions, an uplink communication, using an uplink beam corresponding to the downlink beam. Accordingly, the base station 110 may receive, within the one or more CG-SDT occasions, the uplink communication, using a spatial filter corresponding to the downlink beam. For example, the UE 120 may transmit, and the base station 110 may receive, the uplink communication as described in connection with FIGS. 4A and 4B.

By using techniques as described in connection with FIG. 5, the gNB may configure a group of UEs (e.g., including UE 120) for one or more CG-SDT occasions (e.g., occasions in CG-SDT group 515a and/or CG-SDT group 515b) that correspond to downlink beams (e.g., DL beam 505 and/or DL beam 510, respectively). Accordingly, the gNB and the group of UEs reduce network overhead and resource use by improving spectral efficiency of CG-SDT transmissions.

As indicated above, FIG. 5 is provided as an example. Other examples may differ from what is described with respect to FIG. 5.

Figure 6:
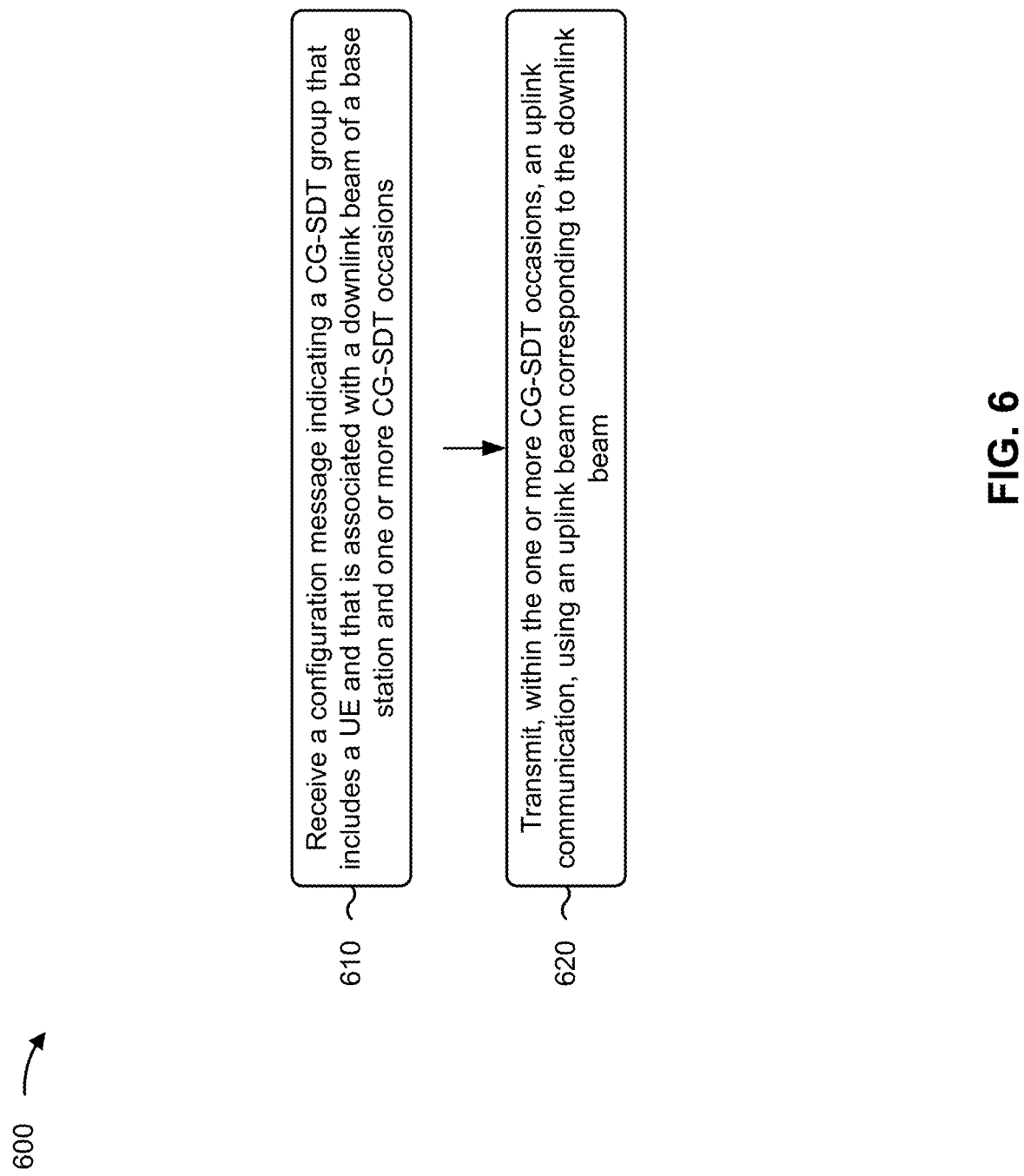
FIGS. 6, 7, 8 and 9 are diagrams illustrating example processes associated with configuring and using beam-based CG-SDT occasions, in accordance with the present disclosure.

FIG. 6 is a diagram illustrating an example process 600 performed, for example, by a UE, in accordance with the present disclosure. Example process 600 is an example where the UE (e.g., UE 120) performs operations associated with using beam-based CG-SDT occasions.

As shown in FIG. 6, in some aspects, process 600 may include receiving, from a base station (e.g., base station 110), a configuration message indicating a CG-SDT group that includes the UE (block 610). For example, the UE (e.g., using antenna 252, modem 254, MIMO detector 256, receive processor 258, controller/processor 280, and/or memory 282) may receive, from a base station, a configuration message indicating a CG-SDT group that includes the UE, as described herein. In some aspects, the CG-SDT group is associated with a downlink beam of the base station and one or more CG-SDT occasions.

As further shown in FIG. 6, in some aspects, process 600 may include transmitting, to the base station and within the one or more CG-SDT occasions, an uplink communication, using an uplink beam of the UE corresponding to a downlink beam of the UE (block 620). For example, the UE (e.g., using antenna 252, transmit processor 264, TX MIMO processor 266, modem 254, controller/processor 280, and/or memory 282) may transmit, to the base station and within the one or more CG-SDT occasions, the uplink communication, using an uplink beam of the UE corresponding to a downlink beam of the UE, as described herein. In some aspects, the downlink beam of the UE is associated with the downlink beam of the base station used for transmitting at least one of the configuration message, a paging message, or a reference signal.

Process 600 may include additional aspects, such as any single aspect or any combination of aspects described below and/or in connection with one or more other processes described elsewhere herein.

In a first aspect, process 600 further includes measuring (e.g., using antenna 252, modem 254, MIMO detector 256, receive processor 258, controller/processor 280, and/or memory 282) one or more downlink beams transmitted by the base station, and transmitting (e.g., using antenna 252, transmit processor 264, TX MIMO processor 266, modem 254, controller/processor 280, and/or memory 282), to the base station, a CSI report associated with measurements for the one or more downlink beams and a scheduling request for the CG-SDT occasions.

In a second aspect, alone or in combination with the first aspect, the scheduling request is transmitted when measurements for at least one downlink beam satisfy a threshold from the base station, and the scheduling request is multiplexed with the CSI report.

In a third aspect, alone or in combination with one or more of the first and second aspects, process 600 further includes validating (e.g., using receive processor 258, transmit processor 264, TX MIMO processor 266, controller/processor 280, and/or memory 282) uplink timing alignment, on an uplink carrier configured with the one or more CG-SDT occasions, before transmitting the uplink communication, such that the uplink communication is transmitted on the uplink carrier with valid timing alignment (or timing advance), using a waveform indicated by at least one of system information, RRC signaling, or the configuration message.

In a fourth aspect, alone or in combination with one or more of the first through third aspects, validating the uplink timing alignment comprises assessing (e.g., using receive processor 258, transmit processor 264, TX MIMO processor 266, controller/processor 280, and/or memory 282) at least one of variation of one or more downlink beam measurements or a status of a timing advance timer maintained by the UE.

In a fifth aspect, alone or in combination with one or more of the first through fourth aspects, the downlink beam is associated with a downlink reference signal broadcast by the base station.

In a sixth aspect, alone or in combination with one or more of the first through fifth aspects, the downlink reference signal includes at least one of an SSB, a TRS, or a CSI-RS.

In a seventh aspect, alone or in combination with one or more of the first through sixth aspects, process 600 further includes determining (e.g., using receive processor 258, transmit processor 264, TX MIMO processor 266, controller/processor 280, and/or memory 282) the one or more CG-SDT occasions based at least in part on a look-up table or a closed-form formula indicated by at least one of system information or RRC signaling.

In an eighth aspect, alone or in combination with one or more of the first through seventh aspects, process 600 further includes determining (e.g., using receive processor 258, transmit processor 264, TX MIMO processor 266, controller/processor 280, and/or memory 282) the one or more CG-SDT occasions based at least in part on one or more parameters, wherein the one or more parameters include beamforming measurements of downlink reference signals, a periodicity associated with the one or more CG-SDT occasions, a time offset associated with the one or more CG-SDT occasions, or a time duration of the one or more CG-SDT occasions.

In a ninth aspect, alone or in combination with one or more of the first through eighth aspects, the downlink beam is associated with the one or more CG-SDT occasions according to one or more association periods within an association pattern period.

In a tenth aspect, alone or in combination with one or more of the first through ninth aspects, each of the one or more association periods includes one or more configuration periods for the one or more CG-SDT occasions.

In an eleventh aspect, alone or in combination with one or more of the first through tenth aspects, each of the one or more configuration periods is an integer multiple of a burst period associated with the downlink beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
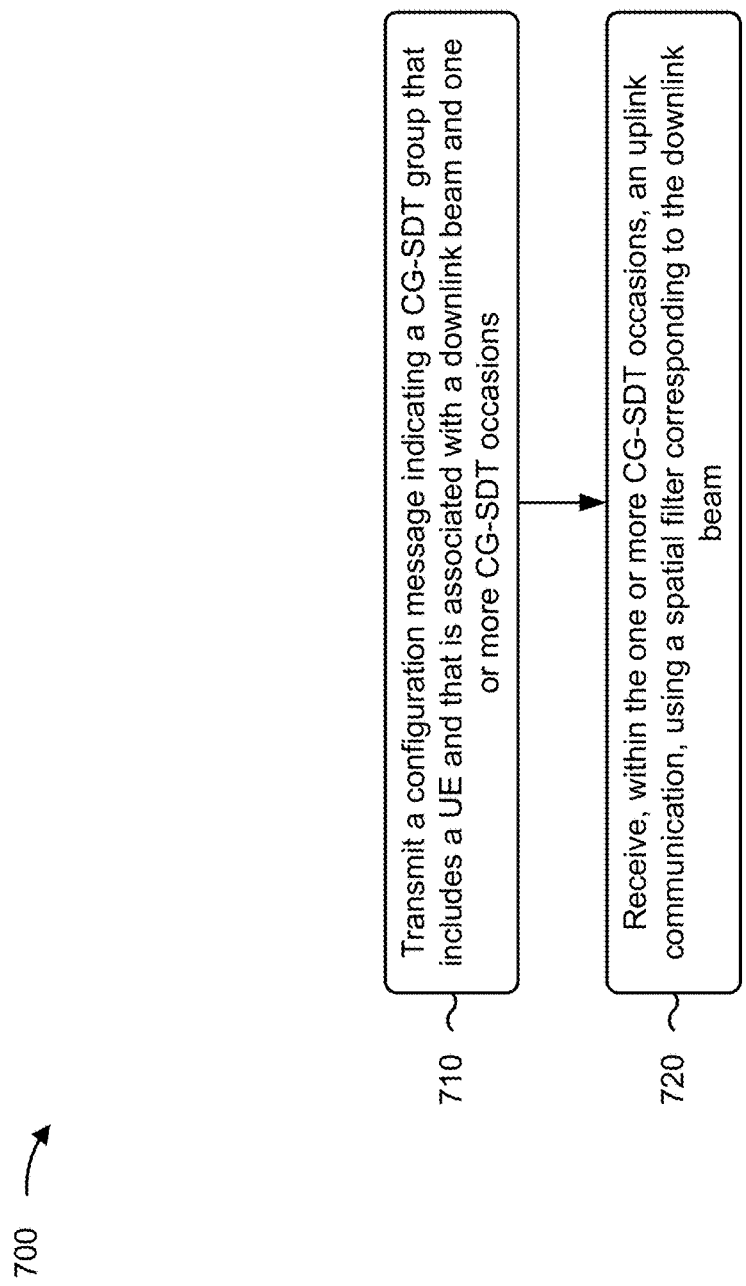

FIG. 7 is a diagram illustrating an example process 700 performed, for example, by a base station, in accordance with the present disclosure. Example process 700 is an example where the base station (e.g., base station 110) performs operations associated with configuring beam-based CG-SDT occasions.

As shown in FIG. 7, in some aspects, process 700 may include transmitting, to a UE (e.g., UE 120), a configuration message indicating a CG-SDT group that includes the UE (block 710). For example, the base station (e.g., using transmit processor 220, TX MIMO processor 230, modem 232, antenna 234, controller/processor 240, memory 242, and/or scheduler 246) may transmit, to a UE, a configuration message indicating a CG-SDT group that includes the UE, as described herein. In some aspects, the CG-SDT group is associated with a downlink beam of the base station and one or more CG-SDT occasions.

As further shown in FIG. 7, in some aspects, process 700 may include receiving, from the UE and within the one or more CG-SDT occasions, an uplink communication, using a spatial filter corresponding to the downlink beam of the base station (block 720). For example, the base station (e.g., using antenna 234, modem 232, MIMO detector 236, receive processor 238, controller/processor 240, and/or memory 242) may receive, from the UE and within the one or more CG-SDT occasions, an uplink communication, using a spatial filter corresponding to the downlink beam of the base station, as described herein.

Process 700 may include additional aspects, such as any single aspect or any combination of aspects described below and/or in connection with one or more other processes described elsewhere herein.

In a first aspect, process 700 further includes receiving (e.g., using antenna 234, modem 232, MIMO detector 236, receive processor 238, controller/processor 240, and/or memory 242), from the UE, a CSI report associated with measurements for one or more downlink beams transmitted by the base station and a scheduling request for the CG-SDT occasions, such that the configuration message is transmitted based at least in part on the report and the scheduling request.

In a second aspect, alone or in combination with the first aspect, the scheduling request is received when measurements of at least one downlink beam satisfy a threshold from the base station, and the scheduling request is multiplexed with the CSI report.

In a third aspect, alone or in combination with one or more of the first and second aspects, the downlink beam is associated with a downlink reference signal broadcast by the base station.

In a fourth aspect, alone or in combination with one or more of the first through third aspects, the downlink reference signal includes at least one of an SSB, a TRS, or a CSI-RS.

In a fifth aspect, alone or in combination with one or more of the first through fourth aspects, process 700 further includes determining (e.g., using transmit processor 220, TX MIMO processor 230, receive processor 238, controller/processor 240, memory 242, and/or scheduler 246) the one or more CG-SDT occasions based at least in part on a look-up table or a closed-form formula indicated by at least one of system information or RRC signaling.

In a sixth aspect, alone or in combination with one or more of the first through fifth aspects, process 700 further includes determining (e.g., using transmit processor 220, TX MIMO processor 230, receive processor 238, controller/processor 240, memory 242, and/or scheduler 246) the one or more CG-SDT occasions based at least in part on one or more parameters, wherein the one or more parameters include beamforming measurements of downlink reference signals, a periodicity associated with the one or more CG-SDT occasions, a time offset associated with the one or more CG-SDT occasions, or a time duration of the one or more CG-SDT occasions.

In a seventh aspect, alone or in combination with one or more of the first through sixth aspects, the downlink beam is associated with the one or more CG-SDT occasions according to one or more association periods within an association pattern period.

In an eighth aspect, alone or in combination with one or more of the first through seventh aspects, each of the one or more association periods includes one or more configuration periods for the one or more CG-SDT occasions.

In a ninth aspect, alone or in combination with one or more of the first through eighth aspects, each of the one or more configuration periods is an integer multiple of a burst period associated with the downlink beam.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
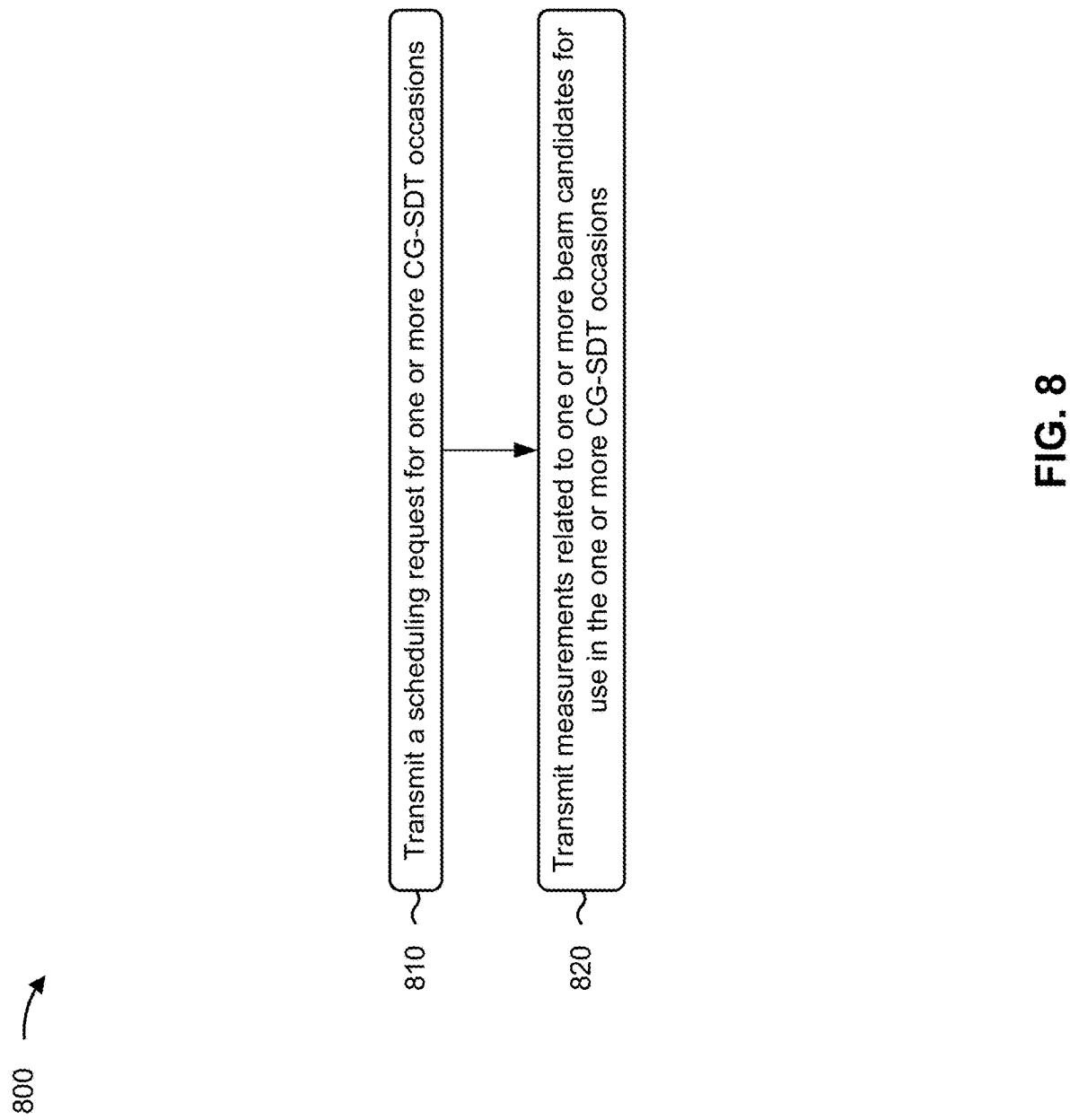

FIG. 8 is a diagram illustrating an example process 800 performed, for example, by a UE, in accordance with the present disclosure. Example process 800 is an example where the UE (e.g., UE 120) performs operations associated with using beam-based CG-SDT occasions.

As shown in FIG. 8, in some aspects, process 800 may include transmitting, to a base station (e.g., base station 110), a scheduling request for one or more CG-SDT occasions (block 810). For example, the UE (e.g., using antenna 252, transmit processor 264, TX MIMO processor 266, modem 254, controller/processor 280, and/or memory 282) may transmit, to a base station, a scheduling request for one or more CG-SDT occasions, as described herein.

As further shown in FIG. 8, in some aspects, process 800 may include transmitting, to the base station, measurements related to one or more beam candidates for use in the one or more CG-SDT occasions (block 820). For example, the UE (e.g., using antenna 252, transmit processor 264, TX MIMO processor 266, modem 254, controller/processor 280, and/or memory 282) may transmit, to the base station, measurements related to one or more beam candidates for use in the one or more CG-SDT occasions, as described herein.

Process 800 may include additional aspects, such as any single aspect or any combination of aspects described below and/or in connection with one or more other processes described elsewhere herein.

In a first aspect, the measurements are transmitted (e.g., using antenna 252, transmit processor 264, TX MIMO processor 266, modem 254, controller/processor 280, and/or memory 282) separately from the scheduling request.

In a second aspect, alone or in combination with the first aspect, the measurements are multiplexed (e.g., using antenna 252, transmit processor 264, TX MIMO processor 266, modem 254, controller/processor 280, and/or memory 282) with the scheduling request.

In a third aspect, alone or in combination with one or more of the first and second aspects, process 800 further includes receiving (e.g., using antenna 252, modem 254, MIMO detector 256, receive processor 258, controller/processor 280, and/or memory 282), from the base station, a query, such that the scheduling request is transmitted based at least in part on the query.

In a fourth aspect, alone or in combination with one or more of the first through third aspects, the scheduling request is transmitted to the base station with a capability message.

In a fifth aspect, alone or in combination with one or more of the first through fourth aspects, process 800 further includes receiving (e.g., using antenna 252, modem 254, MIMO detector 256, receive processor 258, controller/processor 280, and/or memory 282), from the base station, one or more measurement thresholds configured for corresponding downlink reference signals and beam indices, such that the measurements transmitted to the base station satisfy the one or more measurement thresholds configured for corresponding downlink reference signals and beam indices.

In a sixth aspect, alone or in combination with one or more of the first through fifth aspects, process 800 further includes receiving (e.g., using antenna 252, modem 254, MIMO detector 256, receive processor 258, controller/processor 280, and/or memory 282), from the base station, an upper bound on a number of reported beams, such that the one or more beam candidates do not exceed the upper bound.

In a seventh aspect, alone or in combination with one or more of the first through sixth aspects, the scheduling request indicates at least one of a maximum TBS, a maximum MCS, a range of periodicities for the one or more CG-SDT occasions, or the measurements corresponding to the one or more beam candidates.

In an eighth aspect, alone or in combination with one or more of the first through seventh aspects, process 800 further includes receiving (e.g., using antenna 252, modem 254, MIMO detector 256, receive processor 258, controller/processor 280, and/or memory 282), from the base station, a configuration message associated with the one or more CG-SDT occasions.

In a ninth aspect, alone or in combination with one or more of the first through eighth aspects, the configuration message is unicast to the UE.

In a tenth aspect, alone or in combination with one or more of the first through ninth aspects, the configuration message includes additional information for timing advance validation for the UE.

In an eleventh aspect, alone or in combination with one or more of the first through tenth aspects, the configuration message is multicast to a group of UEs including the UE.

In a twelfth aspect, alone or in combination with one or more of the first through eleventh aspects, the configuration message includes additional information for timing advance validation for a plurality of UEs in the group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
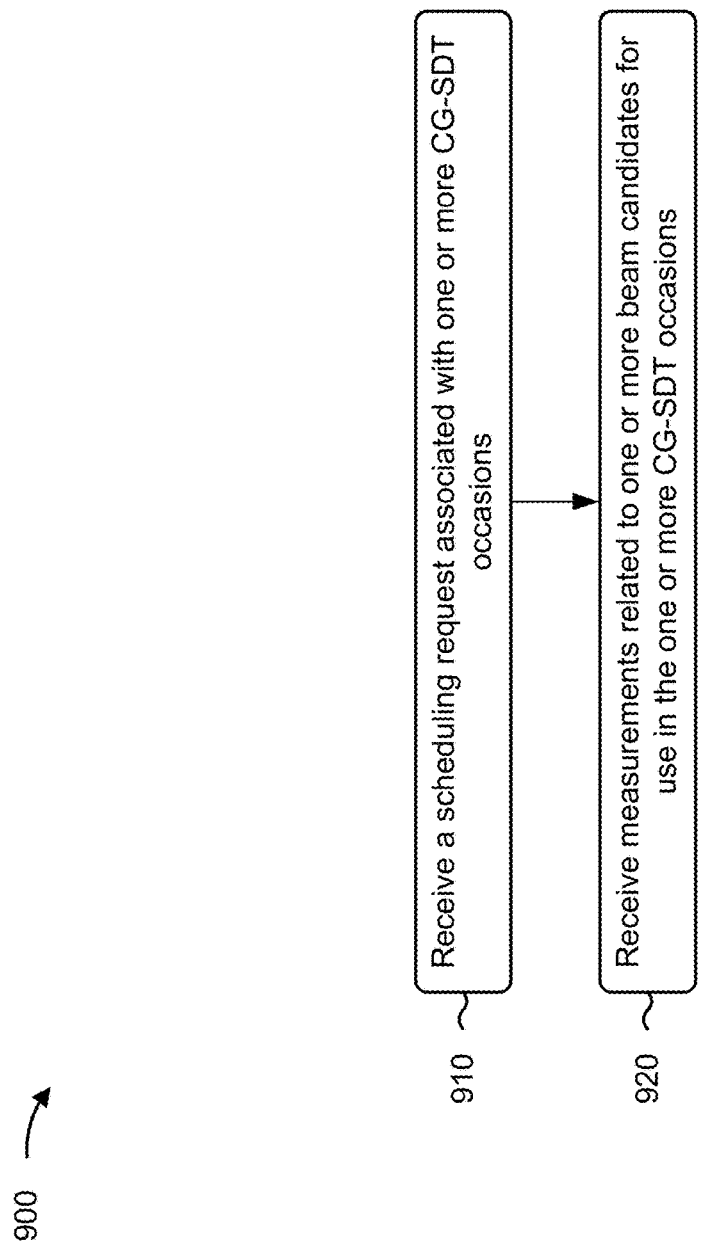

FIG. 9 is a diagram illustrating an example process 900 performed, for example, by a base station, in accordance with the present disclosure. Example process 900 is an example where the base station (e.g., base station 110) performs operations associated with configuring beam-based CG-SDT occasions.

As shown in FIG. 9, in some aspects, process 900 may include receiving, from a UE (e.g., UE 120), a scheduling request associated with one or more CG-SDT occasions (block 910). For example, the base station (e.g., using antenna 234, modem 232, MIMO detector 236, receive processor 238, controller/processor 240, and/or memory 242) may receive, from a UE, a scheduling request associated with one or more CG-SDT occasions, as described herein.

As further shown in FIG. 9, in some aspects, process 900 may include receiving, from the UE, measurements related to one or more beam candidates for use in the one or more CG-SDT occasions (block 920). For example, the base station (e.g., using antenna 234, modem 232, MIMO detector 236, receive processor 238, controller/processor 240, and/or memory 242) may receive, from the UE, measurements related to one or more beam candidates for use in the one or more CG-SDT occasions, as described herein.

Process 900 may include additional aspects, such as any single aspect or any combination of aspects described below and/or in connection with one or more other processes described elsewhere herein.

In a first aspect, the measurements are received (e.g., using antenna 234, modem 232, MIMO detector 236, receive processor 238, controller/processor 240, and/or memory 242) separately from the scheduling request.

In a second aspect, alone or in combination with the first aspect, the measurements are multiplexed (e.g., and received using antenna 234, modem 232, MIMO detector 236, receive processor 238, controller/processor 240, and/or memory 242) with the scheduling request.

In a third aspect, alone or in combination with one or more of the first and second aspects, process 900 further includes transmitting (e.g., using transmit processor 220, TX MIMO processor 230, modem 232, antenna 234, controller/processor 240, memory 242, and/or scheduler 246), to the UE, a query, such that the configuration request is received based at least in part on transmitting the query.

In a fourth aspect, alone or in combination with one or more of the first through third aspects, the configuration request is received from the UE with a capability message.

In a fifth aspect, alone or in combination with one or more of the first through fourth aspects, process 900 further includes transmitting (e.g., using transmit processor 220, TX MIMO processor 230, modem 232, antenna 234, controller/processor 240, memory 242, and/or scheduler 246), to the UE, one or more measurement thresholds configured for corresponding downlink reference signals and beam indices, such that the measurements received from the UE satisfy the one or more measurement thresholds configured for corresponding downlink reference signals and beam indices.

In a sixth aspect, alone or in combination with one or more of the first through fifth aspects, the one or more measurement thresholds are based at least in part on a bandwidth associated with the base station, a cell size associated with the base station, a capability associated with the UE, or a capability associated with the base station.

In a seventh aspect, alone or in combination with one or more of the first through sixth aspects, process 900 further includes transmitting (e.g., using transmit processor 220, TX MIMO processor 230, modem 232, antenna 234, controller/processor 240, memory 242, and/or scheduler 246), to the UE, an upper bound on a number of reported beams, such that the one or more beam candidates do not exceed the upper bound.

In an eighth aspect, alone or in combination with one or more of the first through seventh aspects, the scheduling request indicates at least one of a maximum TBS, a maximum MCS, a range of periodicities for the one or more CG-SDT occasions, or the measurements corresponding to the one or more beam candidates.

In a ninth aspect, alone or in combination with one or more of the first through eighth aspects, process 900 further includes transmitting (e.g., using transmit processor 220, TX MIMO processor 230, modem 232, antenna 234, controller/processor 240, memory 242, and/or scheduler 246), to the UE, a configuration message associated with the one or more CG-SDT occasions.

In a tenth aspect, alone or in combination with one or more of the first through ninth aspects, the configuration message is unicast to the UE.

In an eleventh aspect, alone or in combination with one or more of the first through tenth aspects, the configuration message includes additional information for timing advance validation for the UE.

In a twelfth aspect, alone or in combination with one or more of the first through eleventh aspects, the configuration message is multicast to a group of UEs including the UE.

In a thirteenth aspect, alone or in combination with one or more of the first through twelfth aspects, the configuration message includes additional information for timing advance validation for a plurality of UEs in the group.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving, from a base station, a configuration message indicating a configured grant-small data transfer (CG-SDT) group that includes the UE, wherein the CG-SDT group is associated with a downlink beam of the base station and one or more CG-SDT occasions; and transmitting, to the base station and within the one or more CG-SDT occasions, an uplink communication, using an uplink beam of the UE corresponding to a downlink beam of the UE, wherein the downlink beam of the UE is associated with the downlink beam of the base station used for transmitting at least one of the configuration message, a paging message, or a reference signal.

Aspect 2: The method of Aspect 1, further comprising: measuring one or more downlink beams transmitted by the base station; and transmitting, to the base station, a channel state information (CSI) report associated with measurements for the one or more downlink beams and a scheduling request for the CG-SDT occasions.

Aspect 3: The method of Aspect 2, wherein the scheduling request is transmitted when measurements for at least one downlink beam satisfy a threshold from the base station, and wherein the scheduling request is multiplexed with the CSI report.

Aspect 4: The method of any of Aspects 1 through 3, further comprising: validating uplink timing alignment, on an uplink carrier configured with the one or more CG-SDT occasions, before transmitting the uplink communication, wherein the uplink communication is transmitted on the uplink carrier with valid timing alignment, using a waveform indicated by at least one of system information, radio resource control (RRC) signaling, or the configuration message.

Aspect 5: The method of Aspect 4, wherein validating the uplink timing alignment comprises: assessing at least one of variation of one or more downlink beam measurements or a status of a timing advance timer maintained by the UE.

Aspect 6: The method of any of Aspects 1 through 5, wherein the downlink beam is associated with a downlink reference signal broadcast by the base station.

Aspect 7: The method of Aspect 6, wherein the downlink reference signal includes at least one of a synchronization signal block (SSB), a tracking reference signal (TRS), or a channel state information reference signal (CSI-RS).

Aspect 8: The method of any of Aspects 1 through 7, further comprising: determining the one or more CG-SDT occasions based at least in part on a look-up table or a closed-form formula indicated by at least one of system information or RRC signaling.

Aspect 9: The method of any of Aspects 1 through 8, further comprising: determining the one or more CG-SDT occasions based at least in part on one or more parameters, wherein the one or more parameters include: beam measurements of downlink reference signals, a periodicity associated with the one or more CG-SDT occasions, a time offset associated with the one or more CG-SDT occasions, or a time duration of the one or more CG-SDT occasions.

Aspect 10: The method of any of Aspects 1 through 9, wherein the downlink beam is associated with the one or more CG-SDT occasions according to one or more association periods within an association pattern period.

Aspect 11: The method of Aspect 10, wherein each of the one or more association periods includes one or more configuration periods for the one or more CG-SDT occasions.

Aspect 12: The method of Aspect 11, wherein each of the one or more configuration periods is an integer multiple of a burst period associated with the downlink beam.

Aspect 13: A method of wireless communication performed by a base station, comprising: transmitting, to a user equipment (UE), a configuration message indicating a configured grant-small data transfer (CG-SDT) group that includes the UE, wherein the CG-SDT group is associated with a downlink beam of the base station and one or more CG-SDT occasions; and receiving, from the UE and within the one or more CG-SDT occasions, an uplink communication, using a spatial filter corresponding to the downlink beam of the base station.

Aspect 14: The method of Aspect 13, further comprising: receiving, from the UE, a CSI report associated with measurements for one or more downlink beams transmitted by the base station and a scheduling request for the CG-SDT occasions, wherein the configuration message is transmitted based at least in part on the report and the scheduling request.

Aspect 15: The method of Aspect 14, wherein the scheduling request is received when measurements of at least one downlink beam satisfy a threshold from the base station, and wherein the scheduling request is multiplexed with the CSI report.

Aspect 16: The method of any of Aspects 13 through 15, wherein the downlink beam is associated with a downlink reference signal broadcast by the base station.

Aspect 17: The method of Aspect 16, wherein the downlink reference signal includes at least one of a synchronization signal block (SSB), a tracking reference signal (TRS), or a channel state information reference signal (CSI-RS).

Aspect 18: The method of any of Aspects 13 through 17, further comprising: determining the one or more CG-SDT occasions based at least in part on a look-up table or a closed-form formula indicated by at least one of system information or radio resource control (RRC) signaling.

Aspect 19: The method of any of Aspects 13 through 18, further comprising: determining the one or more CG-SDT occasions based at least in part on one or more parameters, wherein the one or more parameters include: beam measurements of downlink reference signals, a periodicity associated with the one or more CG-SDT occasions, a time offset associated with the one or more CG-SDT occasions, or a time duration of the one or more CG-SDT occasions.

Aspect 20: The method of any of Aspects 13 through 19, wherein the downlink beam is associated with the one or more CG-SDT occasions according to one or more association periods within an association pattern period.

Aspect 21: The method of Aspect 20, wherein each of the one or more association periods includes one or more configuration periods for the one or more CG-SDT occasions.

Aspect 22: The method of Aspect 21, wherein each of the one or more configuration periods is an integer multiple of a burst period associated with the downlink beam.

Aspect 23: A method of wireless communication performed by a user equipment (UE), comprising: transmitting, to a base station, a scheduling request for one or more configured grant-small data transfer (CG-SDT) occasions; and transmitting, to the base station, measurements related to one or more beam candidates for use in the one or more CG-SDT occasions.

Aspect 24: The method of Aspect 23, wherein the measurements are transmitted separately from the scheduling request.

Aspect 25: The method of Aspect 23, wherein the measurements are multiplexed with the scheduling request.

Aspect 26: The method of any of Aspects 23 through 25, further comprising: receiving, from the base station, a query, wherein the scheduling request is transmitted based at least in part on the query.

Aspect 27: The method of any of Aspects 23 through 26, wherein the scheduling request is transmitted to the base station with a capability message.

Aspect 28: The method of any of Aspects 23 through 27, further comprising: receiving, from the base station, one or more measurement thresholds configured for corresponding downlink reference signals and beam indices, wherein the measurements transmitted to the base station satisfy the one or more measurement thresholds configured for the corresponding downlink reference signals and beam indices.

Aspect 29: The method of any of Aspects 23 through 28, further comprising: receiving, from the base station, an upper bound on a number of reported beams, wherein the one or more beam candidates do not exceed the upper bound.

Aspect 30: The method of any of Aspects 23 through 29, wherein the scheduling request indicates at least one of: a maximum transport block size, a maximum modulation and coding scheme, a range of periodicities for the one or more CG-SDT occasions, or the measurements corresponding to the one or more beam candidates.

Aspect 31: The method of any of Aspects 23 through 30, further comprising: receiving, from the base station, a configuration message associated with the one or more CG-SDT occasions.

Aspect 32: The method of Aspect 31, wherein the configuration message is unicast to the UE.

Aspect 33: The method of Aspect 32, wherein the configuration message includes additional information for timing advance validation for the UE.

Aspect 34: The method of Aspect 31, wherein the configuration message is multicast to a group of UEs including the UE.

Aspect 35: The method of Aspect 34, wherein the configuration message includes additional information for timing advance validation for a plurality of UEs in the group.

Aspect 36: A method of wireless communication performed by a base station, comprising: receiving, from a user equipment (UE), a scheduling request associated with one or more configured grant-small data transfer (CG-SDT) occasions; and receiving, from the UE, measurements related to one or more beam candidates for use in the one or more CG-SDT occasions.

Aspect 37: The method of Aspect 36, wherein the measurements are received separately from the scheduling request.

Aspect 38: The method of Aspect 36, wherein the measurements are multiplexed with the scheduling request.

Aspect 39: The method of any of Aspects 36 through 38, further comprising: transmitting, to the UE, a query, wherein the scheduling request is received based at least in part on transmitting the query.

Aspect 40: The method of any of Aspects 36 through 39, wherein the scheduling request is received from the UE with a capability message.

Aspect 41: The method of any of Aspects 36 through 40, further comprising: transmitting, to the UE, one or more measurement thresholds configured for corresponding downlink reference signals and beam indices, wherein the measurements received from the UE satisfy the one or more measurement thresholds configured for corresponding downlink reference signals and beam indices.

Aspect 42: The method of Aspect 41, wherein the one or more measurement thresholds are based at least in part on a bandwidth associated with the base station, a cell size associated with the base station, a capability associated with the UE, or a capability associated with the base station.

Aspect 43: The method of any of Aspects 36 through 42, further comprising: transmitting, to the UE, an upper bound on a number of reported beams, wherein the one or more beam candidates do not exceed the upper bound.

Aspect 44: The method of Aspect 43, wherein the upper bound is based at least in part on a capability associated with the UE.

Aspect 45: The method of any of Aspects 36 through 44, wherein the scheduling request indicates at least one of: a maximum transport block size, a maximum modulation and coding scheme, a range of periodicities for the one or more CG-SDT occasions, or the measurements corresponding to the one or more beam candidates.

Aspect 46: The method of any of Aspects 36 through 45, further comprising: transmitting, to the UE, a configuration message associated with the one or more CG-SDT occasions.

Aspect 47: The method of Aspect 46, wherein the configuration message is unicast to the UE.

Aspect 48: The method of Aspect 47, wherein the configuration message includes additional information for timing advance validation for the UE.

Aspect 49: The method of Aspect 46, wherein the configuration message is multicast to a group of UEs including the UE.

Aspect 50: The method of Aspect 49, wherein the configuration message includes additional information for timing advance validation for a plurality of UEs in the group.

Aspect 51: An apparatus for wireless communication at a device, comprising a processor; memory coupled with the processor; and instructions stored in the memory and executable by the processor to cause the apparatus to perform the method of one or more of Aspects 1-12.

Aspect 52: A device for wireless communication, comprising a memory and one or more processors coupled to the memory, the one or more processors configured to perform the method of one or more of Aspects 1-12.

Aspect 53: An apparatus for wireless communication, comprising at least one means for performing the method of one or more of Aspects 1-12.

Aspect 54: A non-transitory computer-readable medium storing code for wireless communication, the code comprising instructions executable by a processor to perform the method of one or more of Aspects 1-12.

Aspect 55: A non-transitory computer-readable medium storing a set of instructions for wireless communication, the set of instructions comprising one or more instructions that, when executed by one or more processors of a device, cause the device to perform the method of one or more of Aspects 1-12.

Aspect 56: An apparatus for wireless communication at a device, comprising a processor; memory coupled with the processor; and instructions stored in the memory and executable by the processor to cause the apparatus to perform the method of one or more of Aspects 13-22.

Aspect 57: A device for wireless communication, comprising a memory and one or more processors coupled to the memory, the one or more processors configured to perform the method of one or more of Aspects 13-22.

Aspect 58: An apparatus for wireless communication, comprising at least one means for performing the method of one or more of Aspects 13-22.

Aspect 59: A non-transitory computer-readable medium storing code for wireless communication, the code comprising instructions executable by a processor to perform the method of one or more of Aspects 13-22.

Aspect 60: A non-transitory computer-readable medium storing a set of instructions for wireless communication, the set of instructions comprising one or more instructions that, when executed by one or more processors of a device, cause the device to perform the method of one or more of Aspects 13-22.

Aspect 61: An apparatus for wireless communication at a device, comprising a processor; memory coupled with the processor; and instructions stored in the memory and executable by the processor to cause the apparatus to perform the method of one or more of Aspects 23-35.

Aspect 62: A device for wireless communication, comprising a memory and one or more processors coupled to the memory, the one or more processors configured to perform the method of one or more of Aspects 23-35.

Aspect 63: An apparatus for wireless communication, comprising at least one means for performing the method of one or more of Aspects 23-35.

Aspect 64: A non-transitory computer-readable medium storing code for wireless communication, the code comprising instructions executable by a processor to perform the method of one or more of Aspects 23-35.

Aspect 65: A non-transitory computer-readable medium storing a set of instructions for wireless communication, the set of instructions comprising one or more instructions that, when executed by one or more processors of a device, cause the device to perform the method of one or more of Aspects 23-35.

Aspect 66: An apparatus for wireless communication at a device, comprising a processor; memory coupled with the processor; and instructions stored in the memory and executable by the processor to cause the apparatus to perform the method of one or more of Aspects 36-50.

Aspect 67: A device for wireless communication, comprising a memory and one or more processors coupled to the memory, the one or more processors configured to perform the method of one or more of Aspects 36-50.

Aspect 68: An apparatus for wireless communication, comprising at least one means for performing the method of one or more of Aspects 36-50.

Aspect 69: A non-transitory computer-readable medium storing code for wireless communication, the code comprising instructions executable by a processor to perform the method of one or more of Aspects 36-50.

Aspect 70: A non-transitory computer-readable medium storing a set of instructions for wireless communication, the set of instructions comprising one or more instructions that, when executed by one or more processors of a device, cause the device to perform the method of one or more of Aspects 36-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented by any suitable means configured for carrying out the described methods. Implementations may include, for example, different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled with the memory, configured to:
        receive, from a base station, a configuration message indicating a configured grant—small data transfer (CG-SDT) group for the UE, wherein the CG-SDT group is associated with a downlink beam of the base station and one or more CG-SDT occasions;
        validate uplink timing alignment, on an uplink carrier configured with the one or more CG-SDT occasions, before transmitting an uplink communication within the one or more CG-SDT occasions; and
        transmit, to the base station and within the one or more CG-SDT occasions, the uplink communication based at least in part on the downlink beam of the base station used for transmitting a reference signal, wherein the uplink communication is transmitted on the uplink carrier with valid uplink timing alignment, using a waveform indicated by radio resource control (RRC) signaling.

2. The apparatus of claim 1, wherein the one or more processors are further configured to:
    measure one or more downlink beams transmitted by the base station; and
    transmit, to the base station, a channel state information (CSI) report associated with measurements for the one or more downlink beams and a scheduling request for the CG-SDT occasions.

3. The apparatus of claim 2, wherein the scheduling request is transmitted when measurements for at least one downlink beam satisfy a threshold from the base station, and wherein the scheduling request is multiplexed with the CSI report.

4. The apparatus of claim 1, wherein, to validate the uplink timing alignment, the one or more processors are configured to:
    assess at least one of variation of one or more downlink beam measurements or a status of a timing advance timer maintained by the UE.

5. The apparatus of claim 1, wherein the downlink beam is associated with a downlink reference signal broadcast by the base station.

6. The apparatus of claim 5, wherein the downlink reference signal includes at least one of a synchronization signal block (SSB), a tracking reference signal (TRS), or a channel state information reference signal (CSI-RS).

7. The apparatus of claim 1, wherein the one or more processors are further configured to:
    determine the one or more CG-SDT occasions based at least in part on a look-up table or a closed-form formula indicated by at least one of system information or RRC signaling.

8. The apparatus of claim 1, wherein the one or more processors are further configured to:
    determine the one or more CG-SDT occasions based at least in part on one or more parameters, wherein the one or more parameters include at least one of:
        beam measurements of downlink reference signals,
        a periodicity associated with the one or more CG-SDT occasions,
        a time offset associated with the one or more CG-SDT occasions, or
        a time duration of the one or more CG-SDT occasions.

9. The apparatus of claim 1, wherein the downlink beam is associated with the one or more CG-SDT occasions according to one or more association periods within an association pattern period.

10. The apparatus of claim 9, wherein each of the one or more association periods includes one or more configuration periods for the one or more CG-SDT occasions.

11. The apparatus of claim 10, wherein each of the one or more configuration periods is an integer multiple of a burst period associated with the downlink beam.

12. An apparatus for wireless communication at a base station, comprising:
    a memory; and
    one or more processors, coupled with the memory, configured to:
        transmit, fora user equipment (UE), a configuration message indicating a configured grant—small data transfer (CG-SDT) group for the UE, wherein the CG-SDT group is associated with a downlink beam of the base station and one or more CG-SDT occasions; and
        receive, within the one or more CG-SDT occasions, an uplink communication based at least in part on the downlink beam of the base station, wherein the uplink communication is communicated with valid uplink timing alignment on an uplink carrier configured with the one or more CG-SDT occasions, using a waveform indicated by radio resource control (RRC) signaling.

13. The apparatus of claim 12, wherein the one or more processors are further configured to:
receive a channel state information (CSI) report associated with measurements for one or more downlink beams transmitted by the base station and a scheduling request for the CG-SDT occasions.

14. The apparatus of claim 13, wherein the scheduling request is communicated when measurements for at least one downlink beam satisfy a threshold, and wherein the scheduling request is multiplexed with the CSI report.

15. The apparatus of claim 12, wherein the downlink beam is associated with a downlink reference signal broadcast by the base station.

16. The apparatus of claim 15, wherein the downlink reference signal includes at least one of a synchronization signal block (SSB), a tracking reference signal (TRS), or a channel state information reference signal (CSI-RS).

17. The apparatus of claim 12, wherein the one or more CG-SDT occasions are determined based at least in part on a look-up table or a closed-form formula indicated by at least one of system information or RRC signaling.

18. The apparatus of claim 12, wherein the one or more CG-SDT occasions are determined based at least in part on one or more parameters, wherein the one or more parameters include at least one of:
beam measurements of downlink reference signals,
a periodicity associated with the one or more CG-SDT occasions,
a time offset associated with the one or more CG-SDT occasions, or
a time duration of the one or more CG-SDT occasions.

19. The apparatus of claim 12, wherein the downlink beam is associated with the one or more CG-SDT occasions according to one or more association periods within an association pattern period.

20. The apparatus of claim 19, wherein each of the one or more association periods includes one or more configuration periods for the one or more CG-SDT occasions.

21. The apparatus of claim 20, wherein each of the one or more configuration periods is an integer multiple of a burst period associated with the downlink beam.

22. A method for wireless communication performed by a user equipment (UE), comprising:
receiving, from a base station, a configuration message indicating a configured grant—small data transfer (CG-SDT) group for the UE, wherein the CG-SDT group is associated with a downlink beam of the base station and one or more CG-SDT occasions;
validating uplink timing alignment, on an uplink carrier configured with the one or more CG-SDT occasions, before transmitting an uplink communication within the one or more CG-SDT occasions; and
transmitting, to the base station and within the one or more CG-SDT occasions, the uplink communication based at least in part on the downlink beam of the base station used for transmitting a reference signal, wherein the uplink communication is transmitted on the uplink carrier with valid uplink timing alignment, using a waveform indicated by radio resource control (RRC) signaling.

23. The method of claim 22, further comprising:
measuring one or more downlink beams transmitted by the base station; and
transmitting, to the base station, a channel state information (CSI) report associated with measurements for the one or more downlink beams and a scheduling request for the CG-SDT occasions.

24. The method of claim 23, wherein the scheduling request is transmitted when measurements for at least one downlink beam satisfy a threshold from the base station, and wherein the scheduling request is multiplexed with the CSI report.

25. The method of claim 22, wherein validating the uplink timing alignment comprises:
assessing at least one of variation of one or more downlink beam measurements or a status of a timing advance timer maintained by the UE.

26. The method of claim 22, wherein the downlink beam is associated with a downlink reference signal broadcast by the base station.

27. The method of claim 22, further comprising:
determining the one or more CG-SDT occasions based at least in part on a look-up table or a closed-form formula indicated by at least one of system information or RRC signaling.

28. A method for wireless communication performed by a base station, comprising:
transmitting, for a user equipment (UE), a configuration message indicating a configured grant—small data transfer (CG-SDT) group for the UE, wherein the CG-SDT group is associated with a downlink beam of the base station and one or more CG-SDT occasions; and
receiving, within the one or more CG-SDT occasions, an uplink communication based at least in part on the downlink beam of the base station, wherein the uplink communication is communicated with valid uplink timing alignment on an uplink carrier configured with the one or more CG-SDT occasions, using a waveform indicated by radio resource control (RRC) signaling.

29. The method of claim 28, further comprising:
receiving a channel state information (CSI) report associated with measurements for one or more downlink beams transmitted by the base station and a scheduling request for the CG-SDT occasions.

30. The method of claim 29, wherein the scheduling request is communicated when measurements for at least one downlink beam satisfy a threshold, and wherein the scheduling request is multiplexed with the CSI report.

* * * * *